United States Patent
Guo et al.

(10) Patent No.: US 8,300,878 B2
(45) Date of Patent: Oct. 30, 2012

(54) BLIND WAVELET-BASED WATERMARKING METHOD

(75) Inventors: Jing-Ming Guo, Taipei (TW); Yu-Quan Tzeng, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 1086 days.

(21) Appl. No.: 12/206,900

(22) Filed: Sep. 9, 2008

(65) Prior Publication Data

US 2010/0061585 A1    Mar. 11, 2010

(51) Int. Cl.
*B42D 15/00* (2006.01)
*H04N 1/40* (2006.01)
*G09C 3/00* (2006.01)
*H04L 9/32* (2006.01)
*G06K 9/00* (2006.01)

(52) U.S. Cl. ......... 382/100; 283/113; 358/3.28; 380/54; 713/176

(58) Field of Classification Search .................. None
See application file for complete search history.

(56) References Cited

OTHER PUBLICATIONS

J. M. M Guo*, Y. Q. Tzeng, and J. D. Lee, "A blind wavelet-based watermarking with detail-subband coefficients prediction," IPPR Computer Vision, Graphics, and Image Processing Conference, Aug. 2008.*

N. Nikolaidis and I. Pitas, "Robust image watermarking in the spatial domain", Signal Process., vol. 66, No. 3, pp. 385-403, 1998.
R. G. van Sachyndel et al., "A digital watermark," IEEE International conference on Image Processing, vol. 2, pp. 86-90, 1994.
I. J. Cox et al., "Secure spread spectrum watermarking for multimedia," IEEE Transactions on Image Processing, vol. 6, No. 12, pp. 1673-1687, Dec. 1997.
W. Zhu et al., "Multiresolution watermarking for Images and Video," IEEE Transactions on Circuits Systems for Video Technology, vol. 9, No. 4, pp. 545-550, Jun. 1999.
F. Huo and X. Guo, "A wavelet based image watermarking scheme," IEEE International Conference on Image Processing, pp. 2573-2576, Oct. 2006.
V. Solachidis and I. Pitas, "Circularly symmetric watermark embedding in 2-D DFT domain," IEEE Transactions on Image Processing, vol. 10, No. 11, pp. 1741-1753, Nov. 2001.
J. C. Yen et al., "Blind Watermarking Based on the Wavelet Transform," Proceeding of Seventh International Conference on Parallel and Distributed Computing, Applications and Technologies, pp. 474-478, Dec. 2006.
J. Li et al., " Adaptive Watermarking Algorithm Using SVR in Wavelet Domain," IEEE of International conference on Computer and Information Science, pp. 207-211, Jul. 2007.

(Continued)

*Primary Examiner* — Bhavesh Mehta
*Assistant Examiner* — Nirav G Patel
(74) *Attorney, Agent, or Firm* — J.C. Patents

(57) ABSTRACT

A blind wavelet-based watermarking method is provided to extract one or more embedded watermarks form one or more high subbands of a watermarked image generated by 1-level or 2 level wavelet transform. One or more least-mean-square (LMS) filters are trained to predict the data sets in the high subbands of an original image by converting a low subband of the watermarked image. Therefore, the one or more embedded watermarks could be extracted by comparing the predicted data sets in the high subbands with data sets in corresponding subbands of the watermarked image.

4 Claims, 33 Drawing Sheets

OTHER PUBLICATIONS

C. I. Podilchuk and W. Zeng, "Image-Adaptive Watermarking Using Visual Models," IEEE Journal on Selected Areas Communications, vol. 16, No. 4, pp. 525-539, May 1998.

C. De Christophe et al., "Invisibility and Application Functionalities in Perceptual Watermarking—An Overview," Proceedings of IEEE, vol. 90, No. 1, pp. 64-77, Jan. 2002.

A. B. Watson et al., "Visibility of Wavelet Quantization Noise," IEEE Transactions on Image Processing, vol. 6, No. 8, pp. 1164-1174, Aug. 1997.

B. Windrow et al., "Stationary and Nonstationary Learning Characteristics of the LMS Adaptive Filter," Proceedings of IEEE, vol. 64, No. 8, pp. 1151-1162, Aug. 1976.

J. M. Guo, "A New Model-Based Digital Halftoning and Data Hiding Designed With LMS Optimization," IEEE Transactions on Multimedia, vol. 9, No. 4, pp. 687-700, Jun. 2007.

A. P. Bradley, "A Wavelet Visible Difference Predictor," IEEE Transactions on Image Processing, vol. 8, No. 5, pp. 717-730, May 1999.

* cited by examiner

| Subband | | Extracted watermark | Filtered watermark | |
|---|---|---|---|---|
| | | | 3x3 | 5x5 |
| LH$_1$ | CDR | 88.20 | 93.72 | 91.89 |
| | NC | 0.76 | 0.87 | 0.84 |
| HL$_1$ | CDR | 89.14 | 96.60 | 95.78 |
| | NC | 0.78 | 0.93 | 0.92 |
| HH$_1$ | CDR | 88.22 | 92.91 | 90.26 |
| | NC | 0.76 | 0.86 | 0.81 |
| LH$_2$ | CDR | 88.04 | 91.52 | 89.93 |
| | NC | 0.76 | 0.83 | 0.80 |
| HL$_2$ | CDR | 90.05 | 92.47 | 91.50 |
| | NC | 0.80 | 0.85 | 0.83 |
| HH$_2$ | CDR | 88.71 | 91.75 | 87.66 |
| | NC | 0.77 | 0.84 | 0.75 |

FIG. 26

BLIND WAVELET-BASED WATERMARKING METHOD

BACKGROUND OF THE INVENTION

1. Field of Invention

The present invention is related to a watermarking method, and more specifically, to a blind wavelet-based watermarking method.

2. Description of Related Art

In recent years, due to the growth and improvement in technology of communication network, many enterprises, corporations and academic organizations have applied the Internet to commercial or academic activities for business or research promotion. The activities include, for example, electronic document transmitting, digital image sharing, on-line filming, and on-line radio broadcast. A great convenience has been obtained for the users. However, problems regarding information security such as embezzlement, interpolation and allonym transaction occur. Although many of these problems can be resolved by encryption/decryption technique, copyright approval and verification for the network transmission of valuable medium (such as image, film and music) have become a significant issue for the medium owners. Moreover, as digital cameras and scanners have become popular, digital photographs have become widely distributed over the network. Such a broad distribution results in interpolation and appropriation problems for the photographs, and a copyright protection issue thus occurs. Watermarking is one of the methods to resolve such problems.

The watermarking technique is categorized into spatial domain and frequency domain. In the spatial domain, digital data value is directly changed to embed the watermark. For example, Nikolaidis et al. published their research work "Robust image watermarking in the spatial domain" on "Signal Process", Vol. 66, No. 3, pp. 385-403, 1998, and Schyndel et al. published another research work "A digital watermark" on "IEEE International Conference on Image Processing", Vol. 2, pp. 86-90, 1994. Such methods in the spatial domain have the advantage of fast operation speed, but it is hard to resist damage caused by various types of signal processes, i.e. attacks.

In the frequency domain, the digital data is transformed into frequency domain, using Fourier transform, discrete cosine transform (DCT), or wavelet transform. For example, Cox et al. published a research work "Secure spread spectrum watermarking for multimedia" on "IEEE Transactions on Image Processing", Vol. 6, No. 12, pp. 1673-1687, December 1997. Zhu et al. published a research work "Multiresolution watermarking for images and video" on "IEEE Transactions on Circuits Systems for Video Technology", Vol. 9, No. 4, pp. 545-550, June 1999. Huo et al. published a research work "A wavelet based image watermarking scheme" on "IEEE International Conference on Image Processing", pp. 2573-2576, October 2006. Solachidis et al. published a research work "Circularly symmetric watermark embedding in 2-D DFT domain" on "IEEE Transactions on Image Processing", Vol. 6, No. 11, pp. 1741-1753, November 2001. Yen et al. published a research work "Blind watermarking based on the wavelet transform" on "Proceeding of Seventh International Conference on Parallel and Distributed Computing, Applications and Technologies", pp. 474-478, December 2006. Li et al. published a research work "Adaptive watermarking algorithm using SVR in wavelet domain" on "IEEE of International Conference on Computer and Information Science", pp. 207-211, July 2007.

After transformation in the frequency domain, coefficients of specific subbands for the transformation are obtained and used to embed the watermark. The digital data with embedded watermark then is converted to the previous spatial domain by executing inverse Fourier transform, inverse DCT or inverse wavelet transform such that the watermarked data resembling the original data is obtained. The methods performed in the frequency domain require a huge operation, but have a better capability to resist various attacks. Nevertheless, the methods of Cox et al. and Zhu et al. must compare the watermarked data with the original data to obtain the embedded watermark such that the transmission load of data cannot be reduced to achieve the purpose for effective transmission. Additionally, although the methods of Huo et al. and Solachidis et al. can extract the embedded watermark without using the original data, the original watermark or other additive information is still required. Further, even though the methods of Yen et al. and Li et al. are capable of extracting the embedded watermark merely according to the watermarked data, the capacity for hiding the watermark is extremely limited. Through an accurate calculation based on the methods of Yen et al. and Li et al., a ratio of the data amount of the embedded watermark to the data amount of the original data is 1.5625%, i.e.

$$\frac{1}{4^3}$$

for a 3-level wavelet transform.

SUMMARY OF THE INVENTION

Accordingly, the objective of the present invention is to provide a blind wavelet-based watermarking method for extracting at least one hidden watermark from a watermarked image. The method comprises performing a wavelet transform to decompose the watermarked image into a first data set in a subband $LL_1$, a second data set in a subband $LH_1$, a third data set in a subband $HL_1$ and a fourth data set in a subband $HH_1$; converting the first data set in the subband $LL_1$ into a first predicted data set in the subband $LH_1$, into a second predicted data set in the subband $HL_1$, and into a third predicted data set in the subband $HH_1$ via three LMS (least-mean-square) filters; and extracting the at least one hidden watermark by comparing the first predicted data set with the second data set, comparing the second predicted data set with the third data set, or comparing the third predicted data set with the fourth data set.

According to an exemplary embodiment of the present invention, extracting the at least one hidden watermark is extracting a first hidden watermark by comparing the first predicted data set with the second data set, extracting a second hidden watermark by comparing the second predicted data set with the third data set, and extracting a third hidden watermark by comparing the third predicted data set with the fourth data set.

According to an exemplary embodiment of the present invention, the wavelet transform is a 5/3 wavelet transform.

According to an exemplary embodiment of the present invention, the wavelet transform is a 9/7 wavelet transform.

A further object of the present invention is to provide a blind wavelet-based watermarking method for extracting at least one hidden watermark from a watermarked image. The method comprises performing a 2-level wavelet transform to decompose the watermarked image into a first data set in a subband $LL_2$, a second data set in a subband $LH_2$, a third data set in a subband $HL_2$, a fourth data set in a subband $HH_2$, a fifth data set in a subband $LH_1$, a sixth data set in a subband $HL_1$, a seventh data set in a subband $HH_1$; converting the first data set in the subband $LL_2$ into a first predicted data set in the subband $LH_2$, into a second predicted data set in the subband $HL_2$, and into a third predicted data set in the subband $HH_2$ via three LMS filters; performing an inverse wavelet transform to transform the first data set, the first predicted data set, the second predicted data set and the third predicted data set into a fourth predicted data set in the subband $LL_1$; converting the fourth predicted data set in the subband $LL_1$ into a fifth predicted data set in the subband $LH_1$, into a sixth predicted data set in the subband $HL_1$, and into a seventh predicted data set in the subband $HH_1$ via other three LMS filters; and extracting the at least one hidden watermark by comparing the first predicted data set with the second data set, comparing the second predicted data set with the third data set, comparing the third predicted data set with the fourth data set, comparing the fifth predicted data set with the fifth data set, comparing the sixth predicted data set with the sixth data set, or comparing the seventh predicted data set with the seventh data set.

According to an exemplary embodiment of the present invention, extracting the at least one hidden watermark is extracting a first hidden watermark by comparing the first predicted data set with the second data set, extracting a second hidden watermark by comparing the second predicted data set with the third data set, extracting a third hidden watermark by comparing the third predicted data set with the fourth data set, extracting a fourth hidden watermark by comparing the fifth predicted data set with the fifth data set, extracting a fifth hidden watermark by comparing the sixth predicted data set with the sixth data set, and extracting a sixth hidden watermark by comparing the seventh predicted data set with the seventh data set.

According to an exemplary embodiment of the present invention, the 2-level wavelet transform is 2-level 5/3 wavelet transform, and the inverse wavelet transform is a 5/3 inverse wavelet transform.

According to an exemplary embodiment of the present invention, the 2-level wavelet transform is 2-level 9/7 wavelet transform, and the inverse wavelet transform is a 9/7 inverse wavelet transform.

A further object of the present invention is to provide method for optimizing coefficients of a least-mean-square (LMS) filter for a wavelet transform in a high subband $\{\lambda, \theta\}$. The parameter $\lambda$ indicates a level of the wavelet transform, and parameter $\theta$ indicates an orientation of the wavelet transform. The LMS filter is adapted to convert a low-frequency image in a low subband into a high-frequency image in the high subband $\{\lambda, \theta\}$. The method comprising following steps: (a) obtaining a reconstructed coefficient $\hat{d}_{\lambda,i,j}^{\theta,k}$ of the high subband $\{\lambda, \theta\}$ at position (i, j) by calculating $$\sum_{m,n \in R} \sum w_{\lambda,m,n}^{\theta,k} a_{\lambda,i+m,j+n},$$

wherein parameters i, j, m and n are integers, k represents a number of iterations for optimizing the LMS filter, R represents a support region of the LMS filter, $w_{\lambda,m,n}^{\theta,k}$ represents a temporary coefficient of the filter for the subband $\{\lambda, \theta\}$ at position (m, n) during a $k^{th}$ iterated optimizing procedure, and $a_{\lambda,i+m,j+n}$ represents an original coefficient of the low subband of level $\lambda$ at position (i+m, j+n); (b) obtaining an error value $e_{\lambda,i,j}^{\theta,k}$ of the high subband $\{\lambda, \theta\}$ at position (i, j) by subtracting the reconstructed coefficient $\hat{d}_{\lambda,i,j}^{\theta,k}$ from an original coefficient $d_{\lambda,i,j}^{\theta}$ of the high subband $\{\lambda, \theta\}$ at position (i, j); and (c) adjusting the temporary coefficient $w_{\lambda,m,n}^{\theta,k}$ of the LMS filter by adding $\mu e_{\lambda,i,j}^{\theta,k} a_{\lambda,i+m,j+n}$, wherein $\mu$ represents an adjusting parameter that used to control a rate of convergence for optimizing the coefficients of the LMS filter, then iterating the steps (a) and (b) until an overall change of the coefficients of the LMS filter is equal to or less than a predetermined value.

In order to make the aforementioned and other objects, features and advantages of the present invention comprehensible, several preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 26 is a summarized table shows the CDRs and NCs of the corresponding subbands $LH_1$, $HL_1$, $HH_1$, $LH_2$, $HL_2$ and $HH_2$.

DESCRIPTION OF EMBODIMENTS

Figure 1:
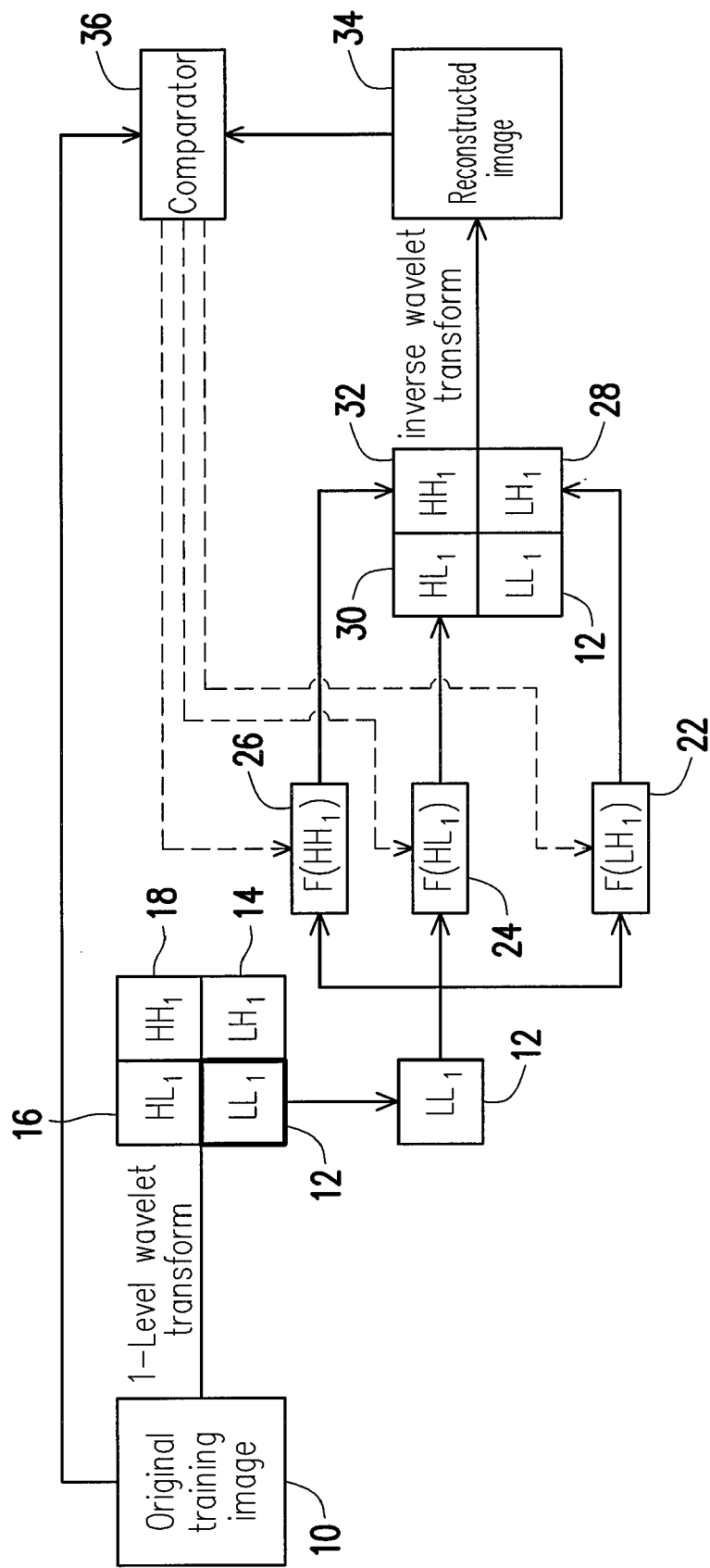
FIG. 1 is a schematic diagram showing the procedure for transforming and reconstructing images via LMS filters.

Before performing the blind wavelet-based watermarking method of the present invention, some filters for reconstructing images would be trained. Each of the trained filters could be termed as a least-mean-square (LMS) filter. Please refer to FIG. 1, which is a schematic diagram showing the procedure for transforming and reconstructing images via three LMS filters 22, 24 and 26. Firstly, several training images are processed by wavelet transform. For example, after a 1-level wavelet transform, each of the training images is decomposed into four subbands $LL_1$, $LH_1$, $HL_1$ and $HH_1$. In each of the $LL_1$, $LH_1$, $HL_1$ and $HH_1$ subbands, a corresponding data set of the training image is reserved. For instance, as shown in FIG. 1, an original training image 10 is decomposed into a first data set 12 in the $LL_1$ subband, a second data set 14 in the $LH_1$ subband, a third data set 16 in the subband, and a fourth data set 18 in the subband $HH_1$. Generally, the data set in the subband $LL_1$ contains the low frequency information of the original training image 10, and the data sets in the subbands $LH_1$, $HL_1$ and $HH_1$ contain the high frequency information of the original training image 10. The original image could be reconstructed lossy or lossless by using the data sets 12, 14, 16 and 18 in the four subbands $LL_1$, $LH_1$, $HL_1$ and $HH_1$. However, in order to enlarge the capacity for hiding watermarks, only the data set 12 in the low subband $LL_1$ is used when reconstructing a reconstructed image 34 via the filters 22, 24 and 26 such that 1 to 3 watermarks could be embed in the three high subbands $LH_1$, $HL_1$ and $HH_1$, wherein the reconstructed image 34 resembles the original training image 10. During reconstructing the reconstructed image 34, the data set 12 in the low subband $LL_1$ is reserved and converted into three predicted data sets 28, 30 and 32 in the high subbands $LH_1$, $HL_1$ and $HH_1$. The data set 12 is converted into the predicted data sets 28, 30 and 32 via the filters 22, 24 and 26 respectively. Later, the data set 12 in the subband $LL_1$ and the three predicted data sets 28, 30 and 32 in the subbands $LH_1$, $HL_1$ and $HH_1$ are transformed into a reconstructed image 34 by an inverse wavelet transform. Once the reconstructed image 34 is obtained, a comparator 36 could be used to compare the reconstructed image 34 with the original training image 10 to determine calculate a peak signal to noise ratio (PSNR) of the reconstructed image 34 and the original training image 10. If the filters 22, 24 and 26 are not optimized yet, the comparator 36 would adjust the coefficients of the filters 22, 24 and 26 to approach the optimized coefficients. On the other hand, if the optimization of the filters 22, 24 and 26 is finished, the comparator 36 would not adjust the coefficients of the filters 22, 24 and 26 no longer. After finishing the optimization of the filters 22, 24 and 26, several training images, which are different from each other, would transformed and reconstructed via the three filters 22, 24 and 26 to verify the ability, of the filters 22, 24 and 26, for reconstructing images.

Figure 2:
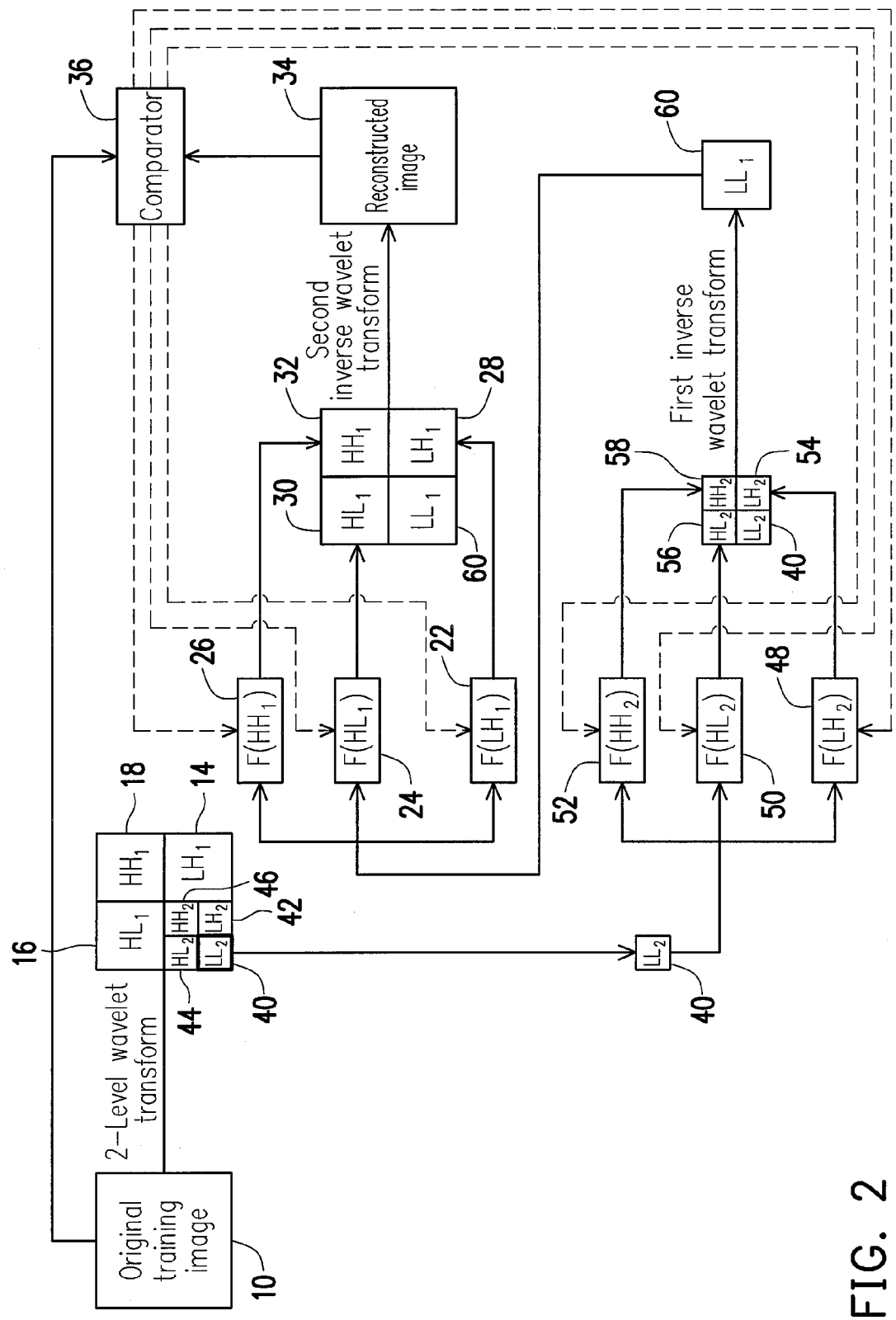
FIG. 2 is a schematic diagram showing the procedure for transforming and reconstructing images via LMS filters adapted to reconstruct 2-level wavelet transformed images.

Similarly, the transforming and reconstructing procedure can be extended to adapt a 2-level wavelet transform. Please refer to FIG. 2, which is a schematic diagram showing the procedure for transforming and reconstructing image via the LMS filters 22, 24, 26, 48, 50 and 52 adapted to reconstruct 2-level wavelet transformed images. Firstly, as shown in FIG. 1, the original training image 10 is decomposed into a first data set 12 in the subband $LL_1$, a second data set 14 in the subband $LH_1$, a third data set 16 in the subband $HL_1$, and a fourth data set 18 in the subband $HH_1$. Later, as shown in FIG. 2, the first data set 12 in the subband $LL_1$ is decomposed into a fifth data set 40 in the subband $LL_2$, a sixth data set 42 in the subband $LH_2$, a seventh data set 44 in the subband $HL_2$, and a eighth data set 46 in the subband $HH_2$. Herein, only the data set 40 in the subband $LL_2$ is used when reconstructing the reconstructed image 34 via the filters 22, 24, 26, 48, 50 and 52 such that 1 to 6 watermarks could be embed in the six subbands $LH_1$, $HL_1$, $HH_1$, $LH_2$, $HL_2$ and $HH_2$. During reconstructing the reconstructed image 34, the data set 40 in the subband $LL_2$ is reserved and converted into three predicted data sets 54, 56 and 58 in the subbands $LH_2$, $HL_2$ and $HH_2$. The data set 40 is converted into the predicted data sets 54, 56 and 58 via the filters 48, 50 and 52 respectively. Then, the data set 40 in the subband $LL_2$ and the three predicted data sets 54, 56 and 58 in the subbands $LH_2$, $HL_2$ and $HH_2$ are transformed into a predicted data set 60 in the subband $LL_1$ by a first inverse wavelet transform.

Later, the predicted data set 60 in the subband $LL_1$ is reserved and converted into other three predicted data sets 28, 30 and 32 in the subbands $LH_1$, $HL_1$ and $HH_1$. The predicted data set 60 is converted into the predicted data sets 28, 30 and 32 via the filters 22, 24 and 26 respectively. Then, the predicted data set 60 in the subband $LL_1$ and the three predicted data sets 28, 30 and 32 in the subbands $LH_1$, $HL_1$ and $HH_1$ are transformed into a reconstructed image 34 by a second inverse wavelet transform. Once the reconstructed image 34 is obtained, the comparator 36 could be used to compare the reconstructed image 34 with the original training image 10 to calculate the PSNR of the reconstructed image 34 and the original training image 10. If the filters 22, 24, 26, 48, 50 and 52 are not optimized yet, the comparator 36 would adjust the coefficients of the filters 22, 24, 26, 48, 50 and 52 to approach the optimized coefficients. On the other hand, if the optimization of the filters 22, 24, 26, 48, 50 and 52 is finished, the comparator 36 would not adjust the coefficients of the filters 22, 24, 26, 48, 50 and 52 no longer. After finishing the optimization of the filters 22, 24, 26, 48, 50 and 52, several training images, which are different from each other, would transformed and reconstructed via the six filters 22, 24, 26, 48, 50 and 52 to verify the ability, of the filters 22, 24, 26, 48, 50 and 52, for reconstructing images.

There are several ways to obtain the optimum coefficients of the LMS filters 22, 24, 26, 48, 50 and 52, i.e. to train the LMS filters, and one of the ways is a novel least-mean-square (LMS) method. The novel LMS method is mathematically described as follows:

$$\hat{d}_{\lambda,i,j}^{\theta,k} = \sum_{m,n \in R} \sum w_{\lambda,m,n}^{\theta,k} a_{\lambda,i+m,j+n}, \quad \theta \in (2,3,4), \lambda \in (1,2) \quad (1)$$

$$e_{\lambda,i,j}^{\theta,k^2} = \left(d_{\lambda,i,j}^{\theta} - \hat{d}_{\lambda,i,j}^{\theta,k}\right)^2 \quad (2)$$

$$\frac{\partial e_{\lambda,i,j}^{\theta,k^2}}{\partial w_{\lambda,m,n}^{\theta,k}} = -2e_{\lambda,i,j}^{\theta,k} a_{\lambda,i+m,j+n} \quad (3)$$

$$\begin{cases} \text{if } w_{\lambda,m,n}^{\theta,k} > w_{\lambda,m,n,opt}^{\theta}, \\ \quad \text{slope} > 0, \quad w_{\lambda,m,n}^{\theta,k} \text{ should be decreased} \\ \text{if } w_{\lambda,m,n}^{\theta,k} < w_{\lambda,m,n,opt}^{\theta}, \\ \quad \text{slope} < 0, \quad w_{\lambda,m,n}^{\theta,k} \text{ should be increased} \end{cases} \quad (4)$$

$$w_{\lambda,m,n}^{\theta,(k+1)} = w_{\lambda,m,n}^{\theta,k} + \mu e_{\lambda,i,j}^{\theta,k} a_{\lambda,i+m,j+n} \quad (5)$$

where parameters i, j, k, v, m and n are integers;

$d_{\lambda,i,j}^{\theta}$ represents an original coefficient of subband $\{\lambda, \theta\}$ at position (i, j);

$\lambda$ represents which level of the wavelet transform, and $\theta$ represents which orientation of the wavelet transform (e.g. $\{1, 2\}$ represents the subband $LH_1$, $\{1, 3\}$ represents the subband $HH_1$, $\{1, 4\}$ represents the subband $HL_1$, $\{2, 2\}$ represents the subband $LH_2$, $\{2, 3\}$ represents the subband $HH_2$, and $\{2, 4\}$ represents the subband $HL_2$);

k represents a number of the iterations of the procedure for training the filter;

$\hat{d}_{\lambda,i,j}^{\theta,k}$ represents a reconstructed coefficient of subband $\{\lambda, \theta\}$ at position (i, j) during the $k^{th}$ iterated training procedure;

$w_{\lambda,m,n}^{\theta,k}$ represents a temporary coefficient of the filter, for the subband $\{\lambda, \theta\}$, at position (m, n) during the $k^{th}$ iterated training procedure;

$a_{\lambda,i+m,j+n}$ represents an original coefficient of a low subband (i.e. $LL_1$ or $LL_2$) of level $\lambda$ at position (i+m, j+n);

R represents a support region or size of the filter (e.g., 3×3, 5×5, 7×7, or 9×9);

$w_{\lambda,m,n,opt}^{\theta}$ represents the optimum coefficient of the filter, for the subband $\{\lambda, \theta\}$, at position (m, n);

$e_{\lambda,i,j}^{\theta,k}$ represents an error value of the subband $\{\lambda, \theta\}$ at position (i, j) during the $k^{th}$ iterated training procedure;

$(e_{\lambda,i,j}^{\theta,k})^2$ represents a mean squared error (MSE) between the reconstructed coefficient $\hat{d}_{\lambda,i,j}^{\theta}$ and the coefficient $d_{\lambda,i,j}^{\theta}$ during the $k^{th}$ iterated training procedure;

$$\frac{\partial e_{\lambda,i,j}^{\theta,k^2}}{\partial w_{\lambda,m,n}^{\theta,k}}$$

represents a partial differentiation value obtained by partial deriving the mean squared error $(e_{\lambda,i,j}^{\theta,k})^2$ with respect to the temporary coefficient $w_{\lambda,m,n}^{\theta,k}$ during the $k^{th}$ iterated training procedure; and μ represents an adjusting parameter that used to control a rate of convergence for optimizing the coefficients of the filter. Herein, μ is set to be $10^{-5}$.

According to the equations (1) and (2), when the filters 22, 24, 26, 48, 50 and 52 are optimized, the reconstructed coefficient $\hat{d}_{\lambda,i,j}^{\theta,k}$ of the subband $\{\lambda, \theta\}$ would be approximate to or equal to the original coefficient $d_{\lambda,i,j}^{\theta}$ of the subband $\{\lambda, \theta\}$ such that the error value $e_{\lambda,i,j}^{\theta,k}$ would be approximate to or equal to zero. Oppositely, if the filters 22, 24, 26, 48, 50 and 52 are not optimized, the error value $e_{\lambda,i,j}^{\theta,k}$ should exceed a predetermined tolerance. Therefore, the partial differentiation value $$\frac{\partial e_{\lambda,i,j}^{\theta,k^2}}{\partial w_{\lambda,m,n}^{\theta,k}},$$

i.e. the slope, would be calculated to determine whether the temporary coefficient $w_{\lambda,m,n}^{\theta,k}$ should be increased or decreased according to the equations (3)-(5).

The purpose of the LMS method is to reconstruct the original coefficients of each of the high subbands $LH_1$, $HL_1$ and $HH_1$ by converting the original coefficients of the low subband $LL_1$ via the filters 22, 24 and 26, or to reconstruct the original coefficients of each of the high subbands $LH_1$, $HL_1$, $HH_1$, $LH_2$, $HL_2$ and $HH_2$ by converting the original coefficients of the low subband $LL_2$ via the filters 22, 24, 26, 48, 50 and 52. After the filters 22, 24, 26, 48, 50 and 52 are optimized, the reconstructed image 34, which resembles the original training image 10, can be obtained by merely decoding the data set 12 in the subband $LL_1$ via the filters 22, 24 and 26, or by merely decoding the data set 40 in the subband $LL_2$ via the filters 22, 24, 26, 48, 50 and 52.

It should be noted that the procedure for training the filters 22, 24, 26, 48, 50 and 52 will repeat until an overall change of the coefficients of each one of the filters 22, 24, 26, 48, 50 and 52 is less than a predetermined value. The predetermined value is approximately zero or equal to zero. The overall change of the coefficients of the filter for the subband $\{\lambda, \theta\}$ is defined as $$\left| \sum_{m,n \in R} \sum \left( w_{\lambda,m,n}^{\theta,(k+1)} - w_{\lambda,m,n}^{\theta,k} \right) \right|.$$

When all of the overall changes of the coefficients of the filters 22, 24, 26, 48, 50 and 52 are less than the predetermined value, the filters 22, 24, 26, 48, 50 and 52 are optimized, and the whole training procedure is finished.

Figure 3:
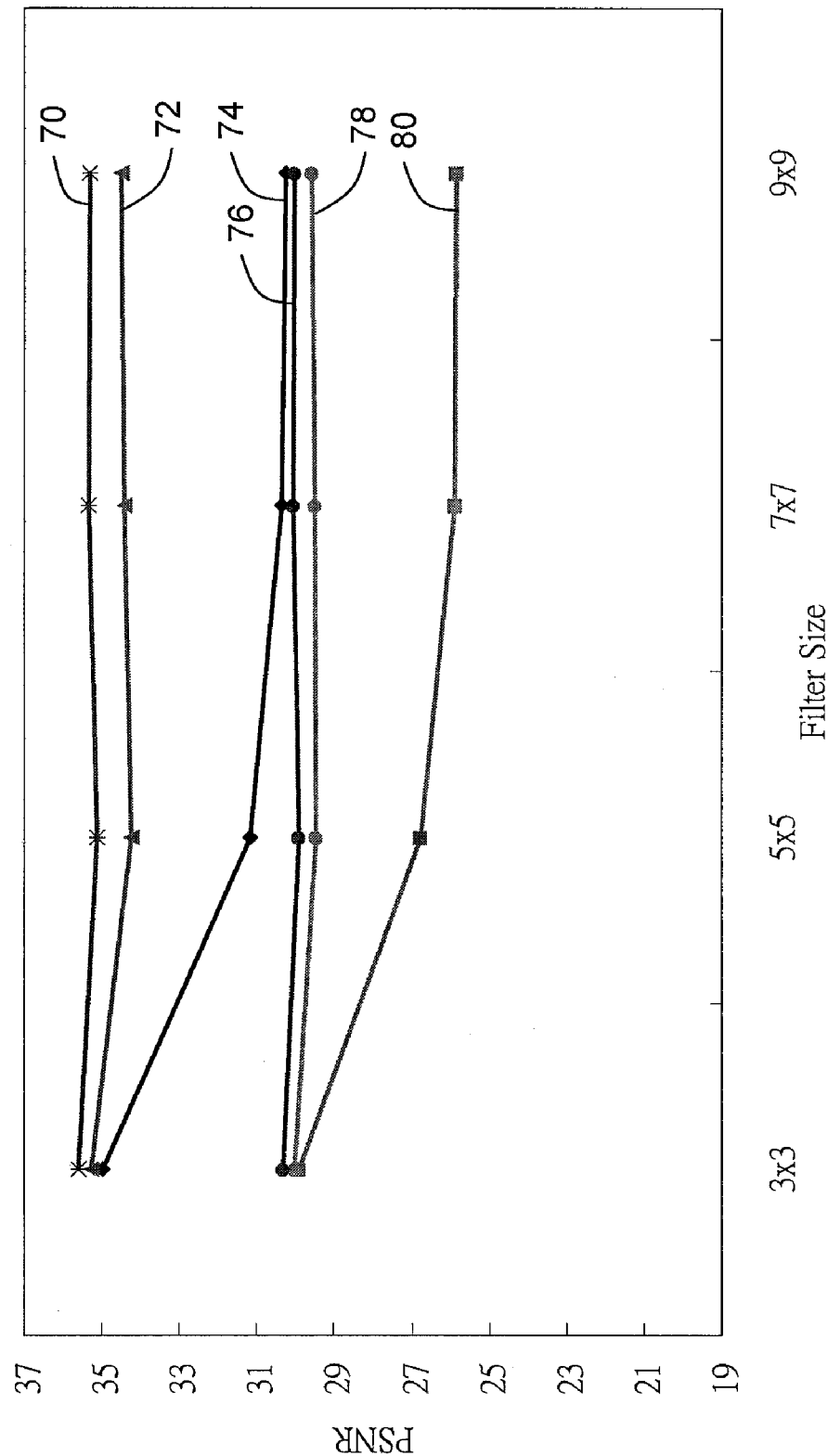
FIG. 3 is an experimental chart showing the relationships between the PSNR and the filter size.

According to practical operations, the PSNR is associated with the size of the filter, the level of the wavelet transform, and the algorithm of the wavelet transform. The smaller is the size of the filter, the greater is the PSNR. The fewer is the level of the wavelet transform, the greater is the PSNR. Moreover, the PSNR of 9/7 wavelet transform is greater than that of 5/3 wavelet transform, and the PSNR of 5/3 wavelet transform is greater than that of Harr wavelet transform. Please refer to FIG. 3, which is an experimental chart showing the relationships between the PSNR and the filter size. Herein, the curve 70 represents the PSNR of 1-level 9/7 wavelet transform, the curve 72 represents the PSNR of 1-level 5/3 wavelet transform, the curve 74 represents the PSNR of 1-level Harr wavelet transform, the curve 76 represents the PSNR of 2-level 9/7 wavelet transform, the curve 78 represents the PSNR of 2-level 5/3 wavelet transform, and the curve 80 represents the PSNR of 2-level Harr wavelet transform.

Figure 4:
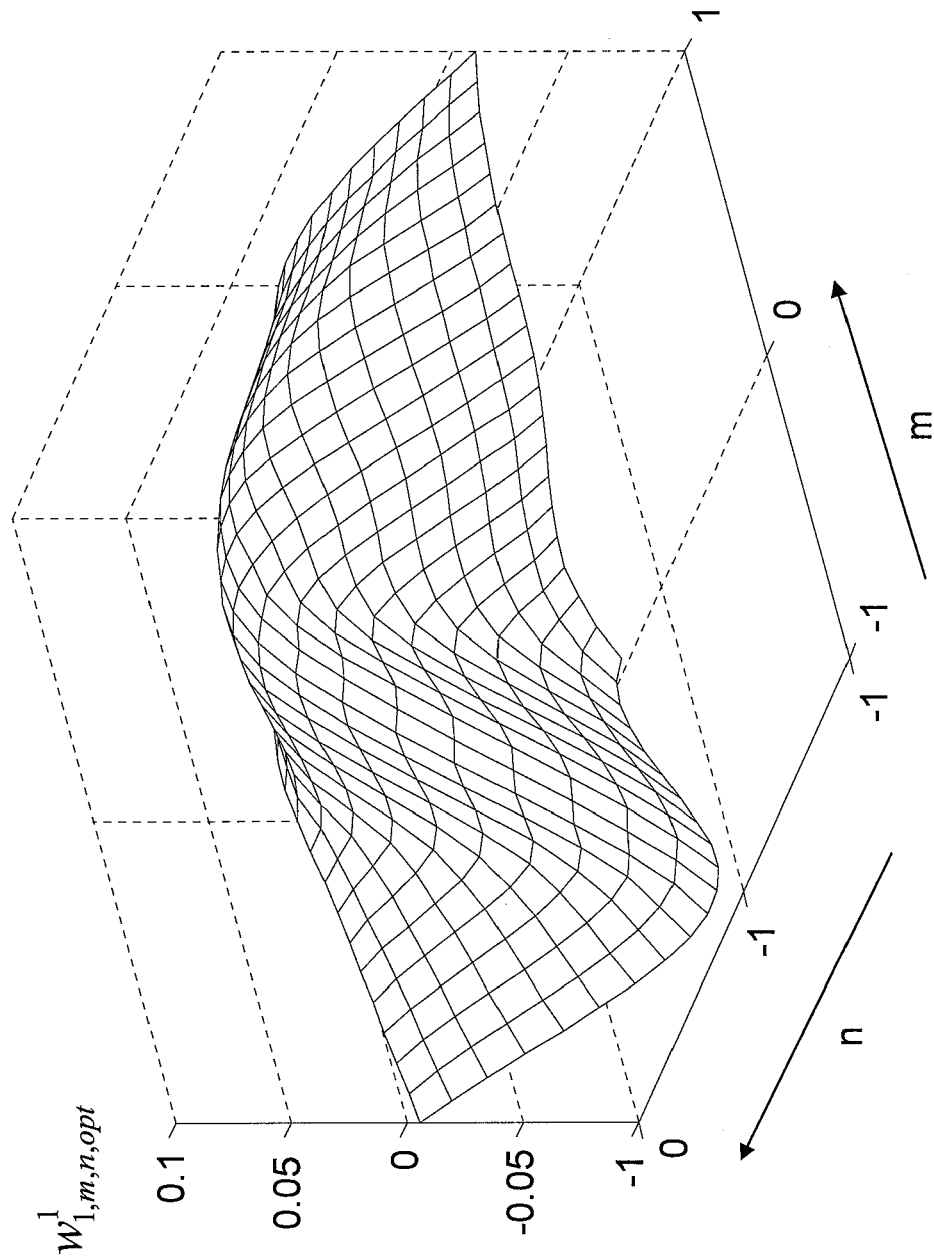
FIGS. 4-6 show the coefficients of the first level LMS filters of a 5/3 wavelet transform respectively.
Figure 5:
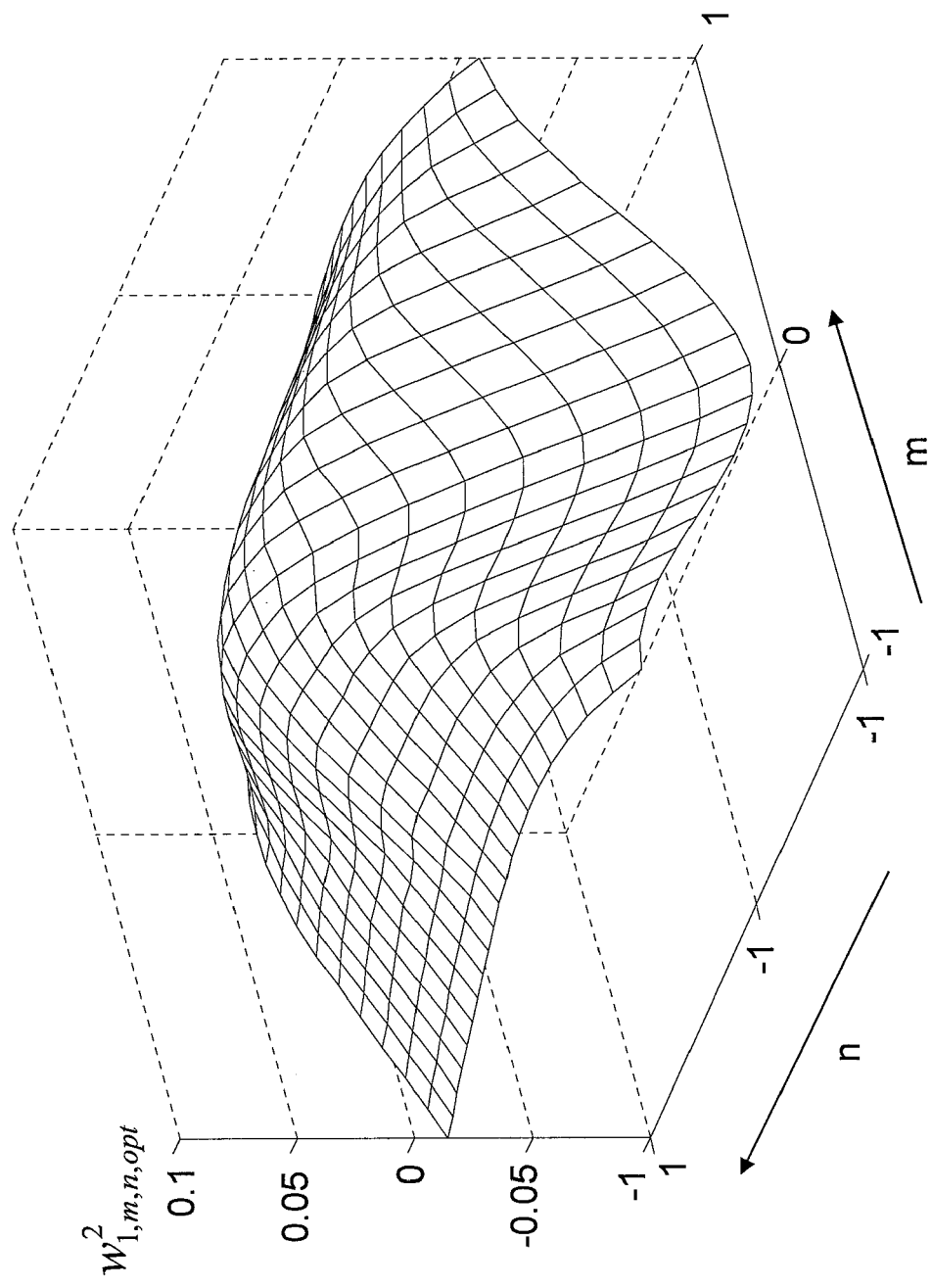
Figure 6:
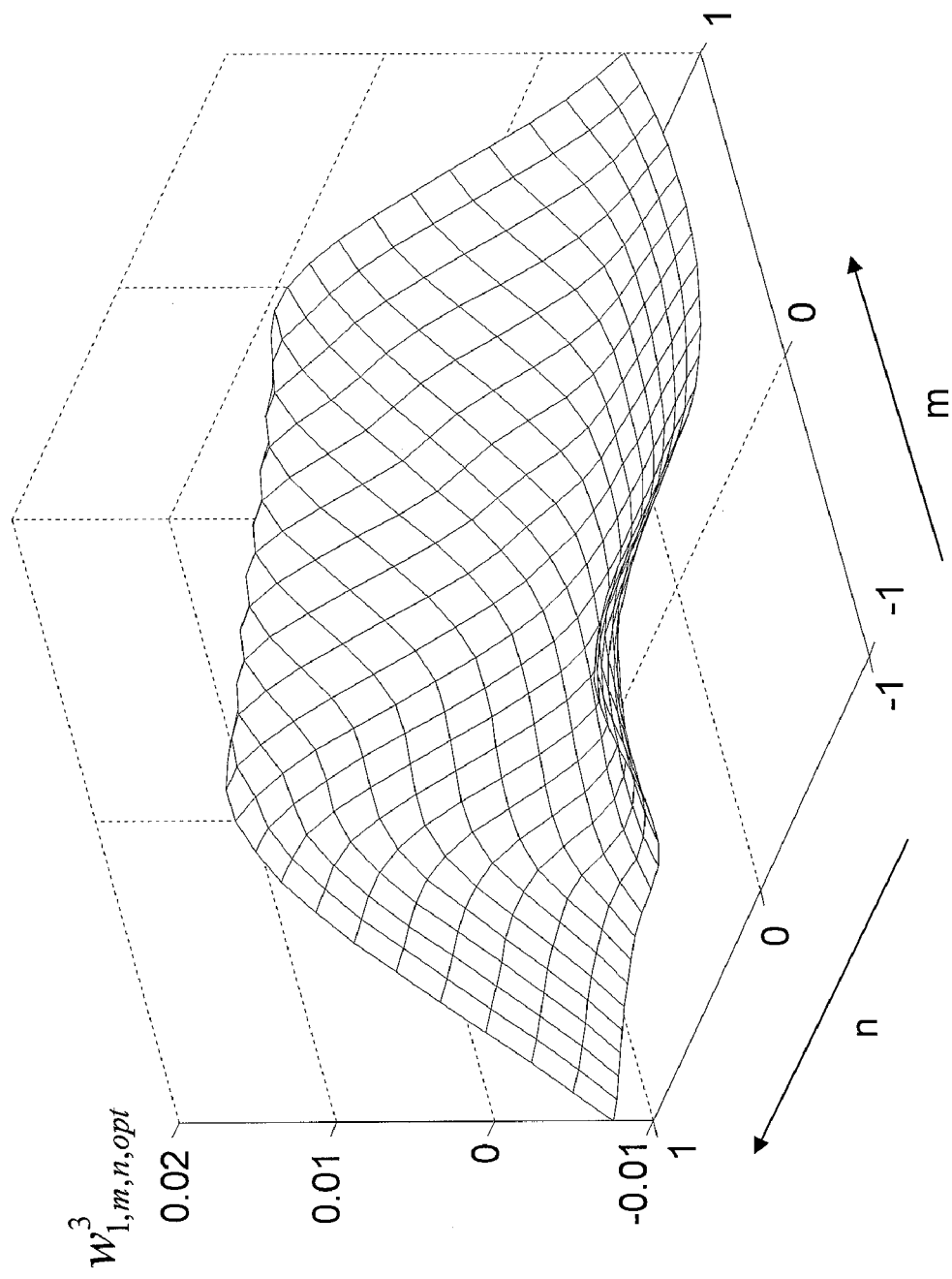
Figure 7:
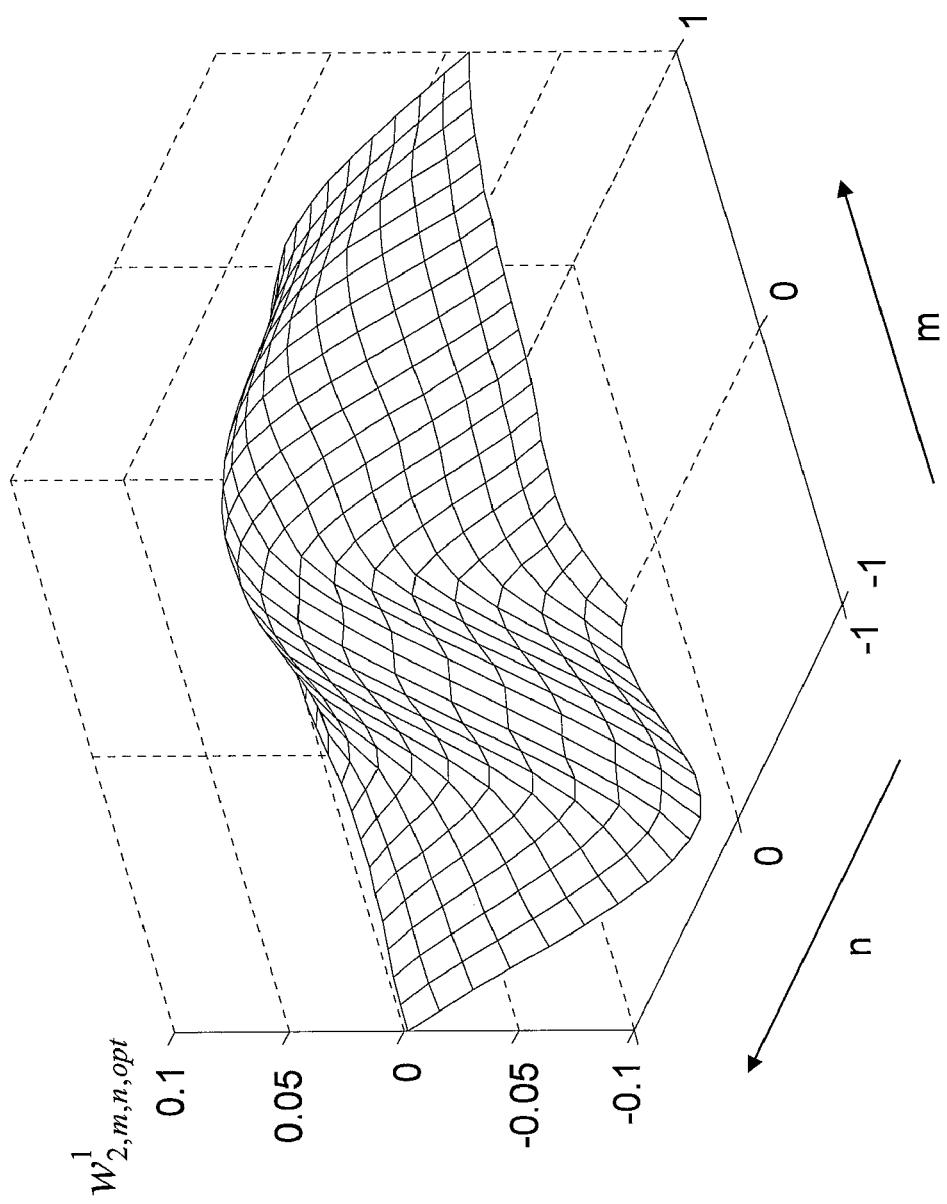
FIGS. 7-9 show the coefficients of the second level LMS filters of a 5/3 wavelet transform respectively.
Figure 8:
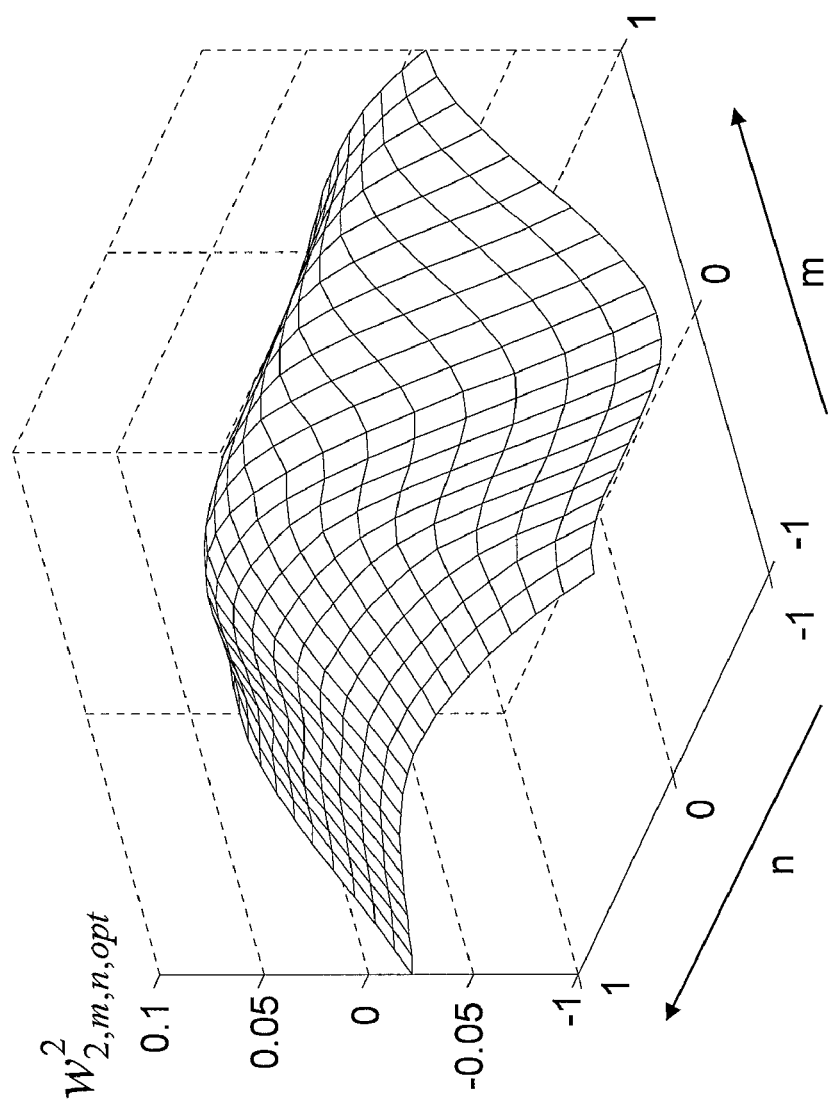
Figure 9:
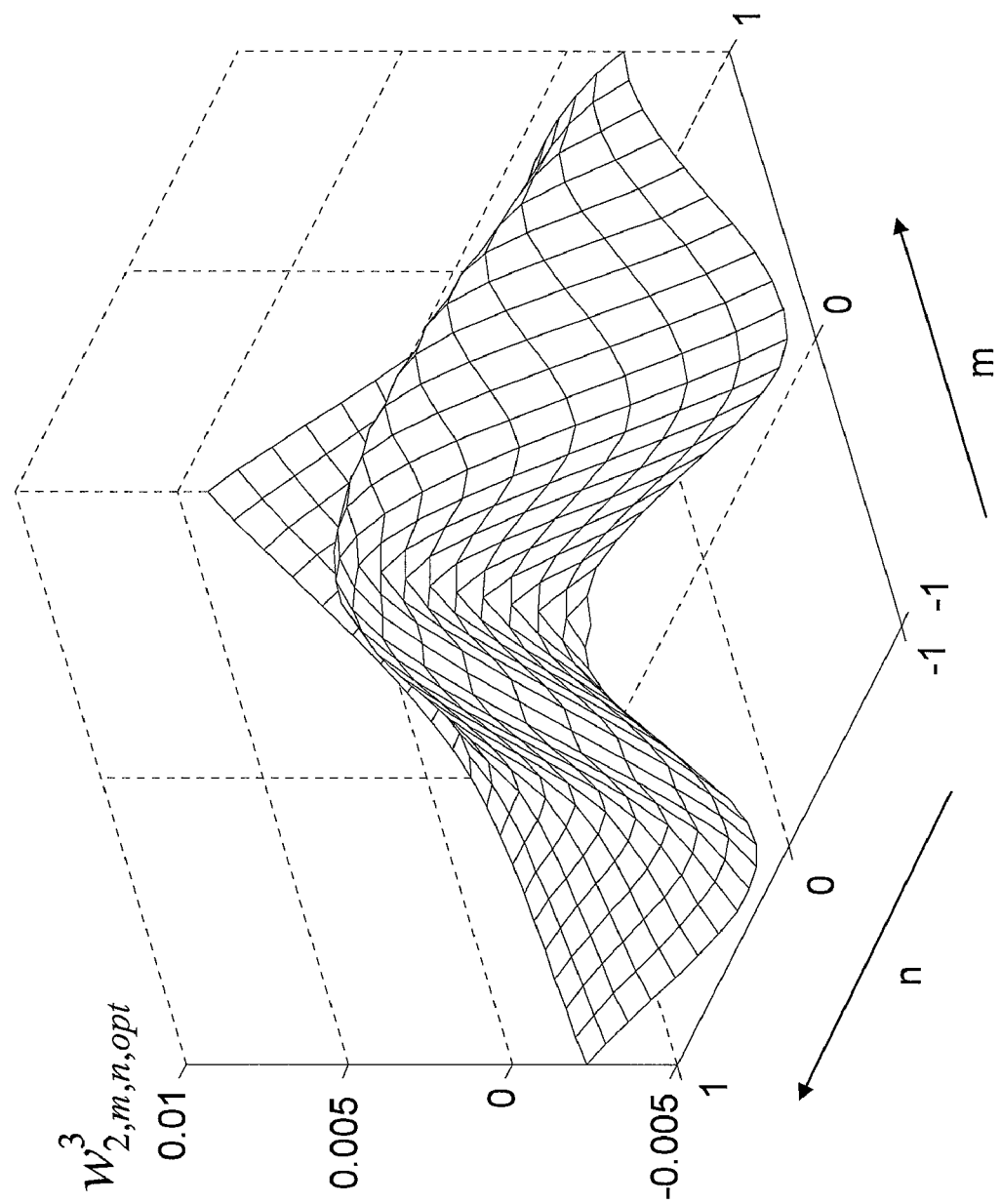
Figure 10:
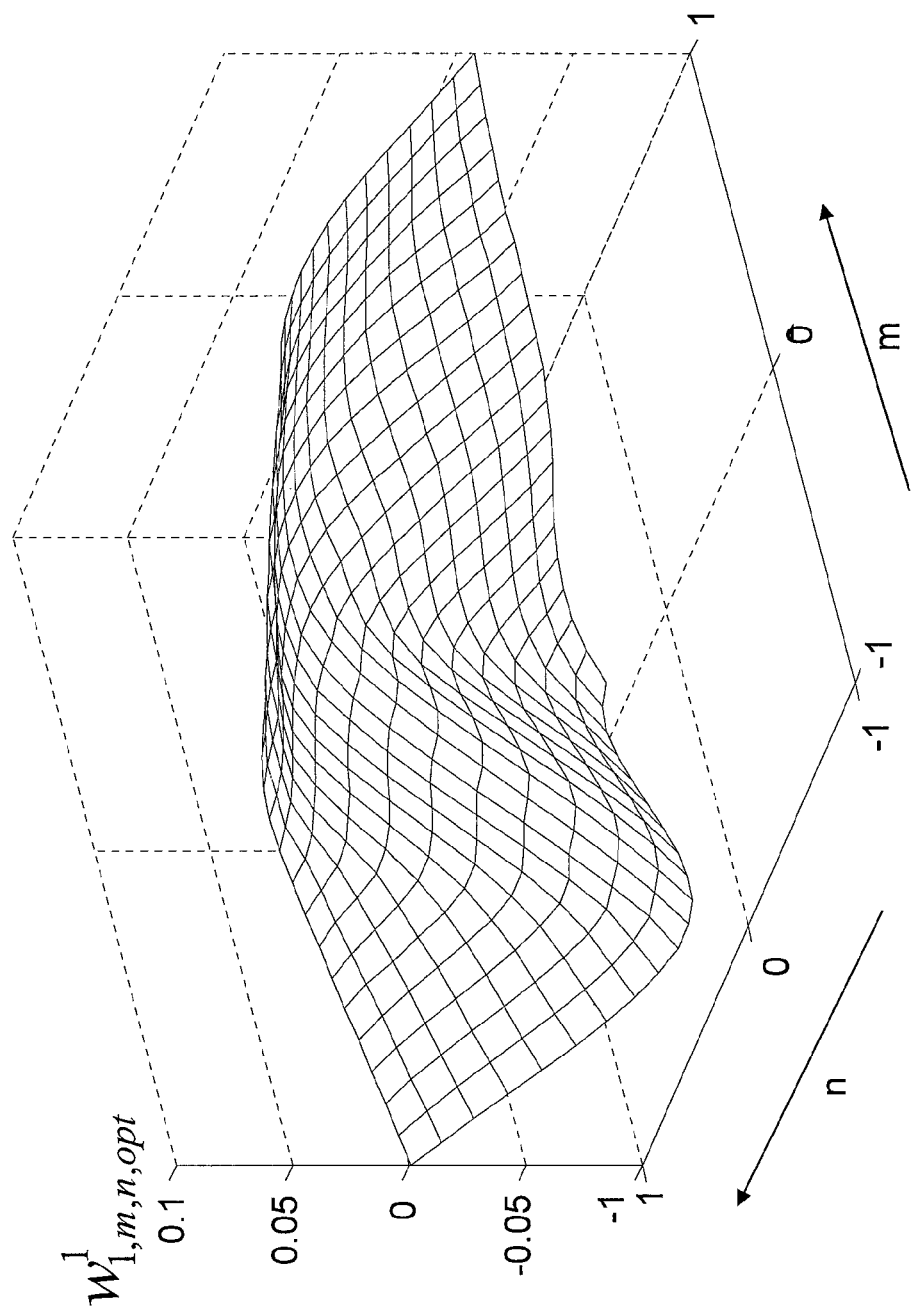
FIGS. 10-12 show the coefficients of the first level LMS filters of a 9/7 wavelet transform respectively.
Figure 11:
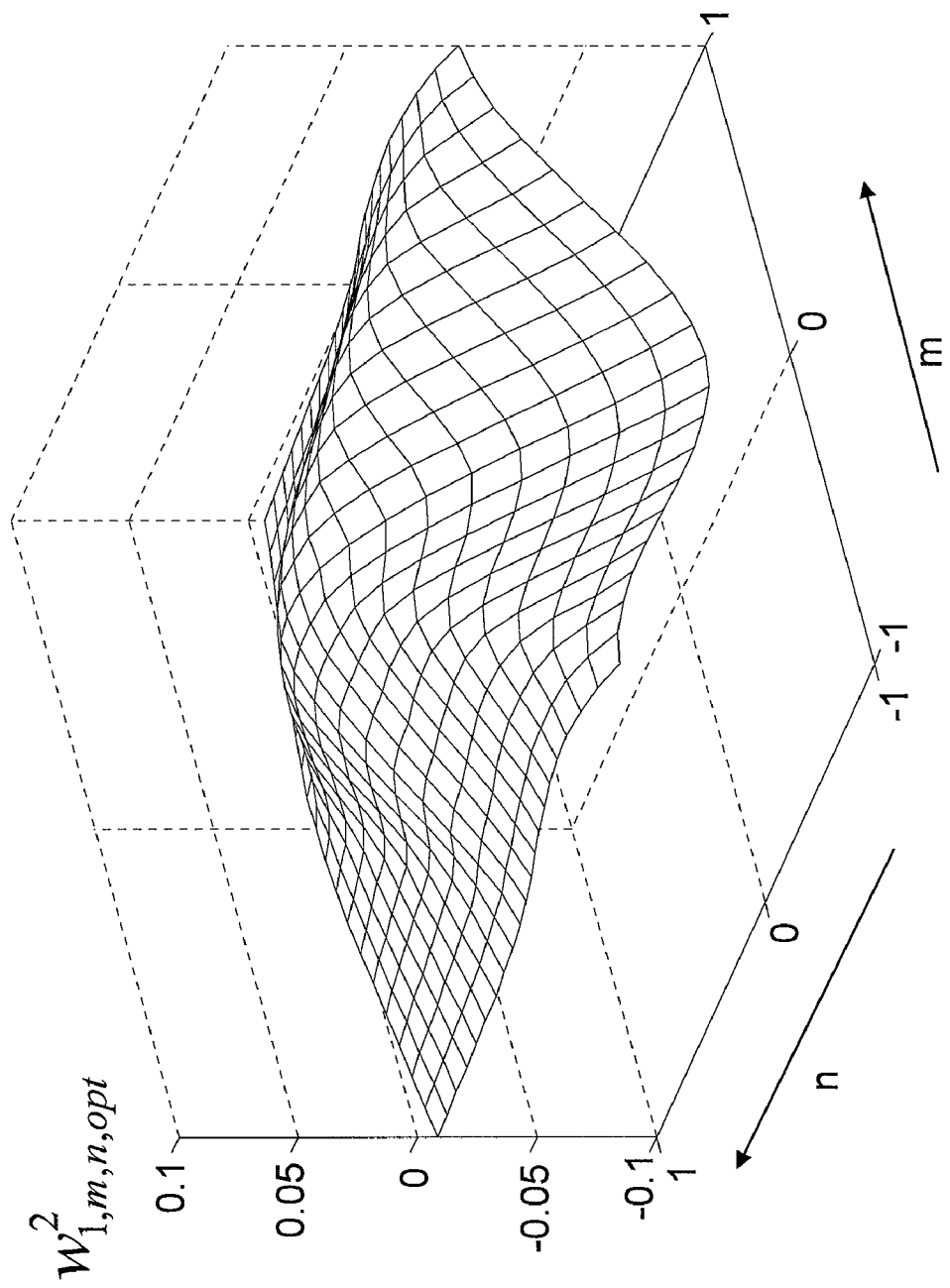
Figure 12:
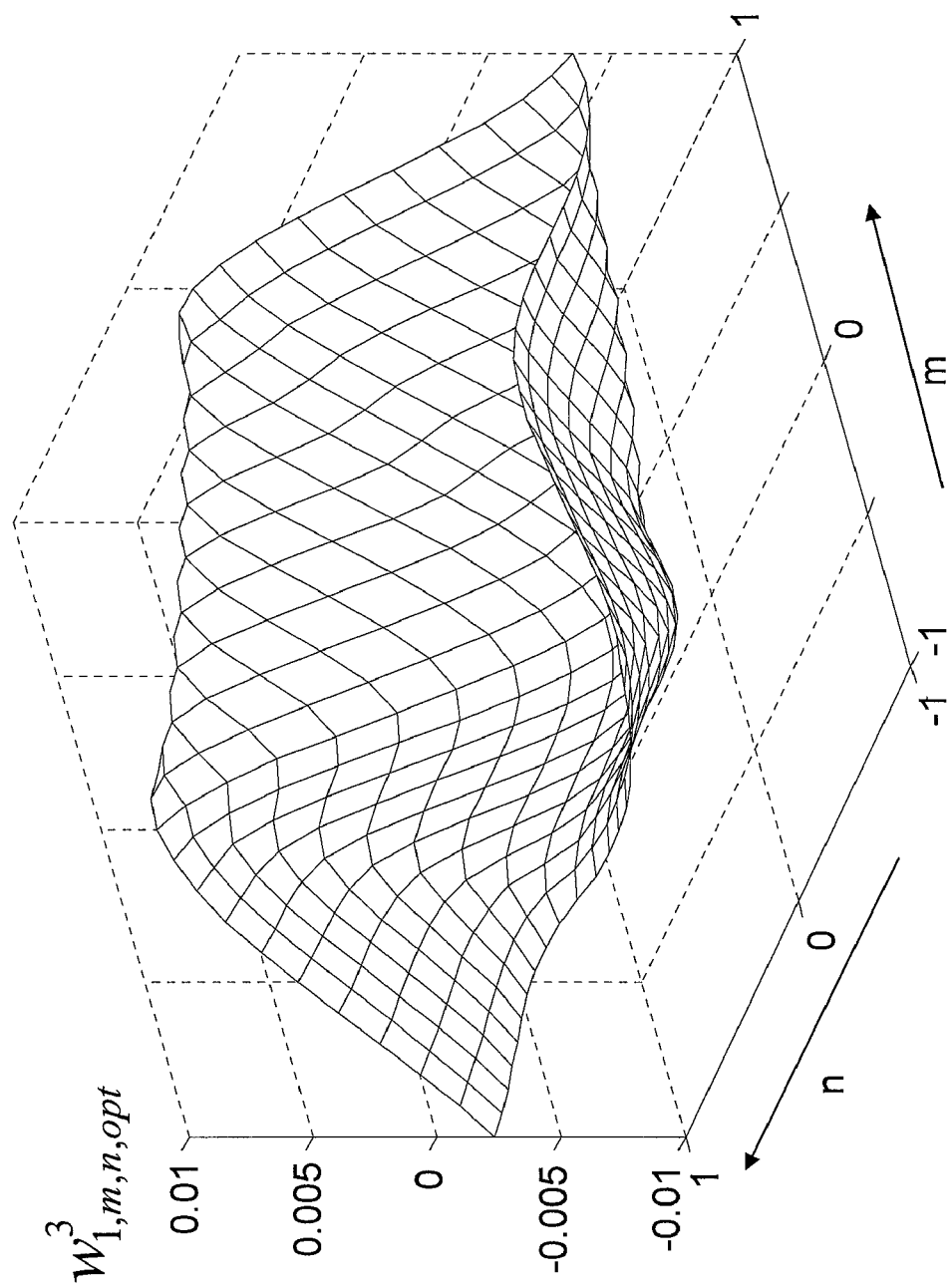
Figure 13:
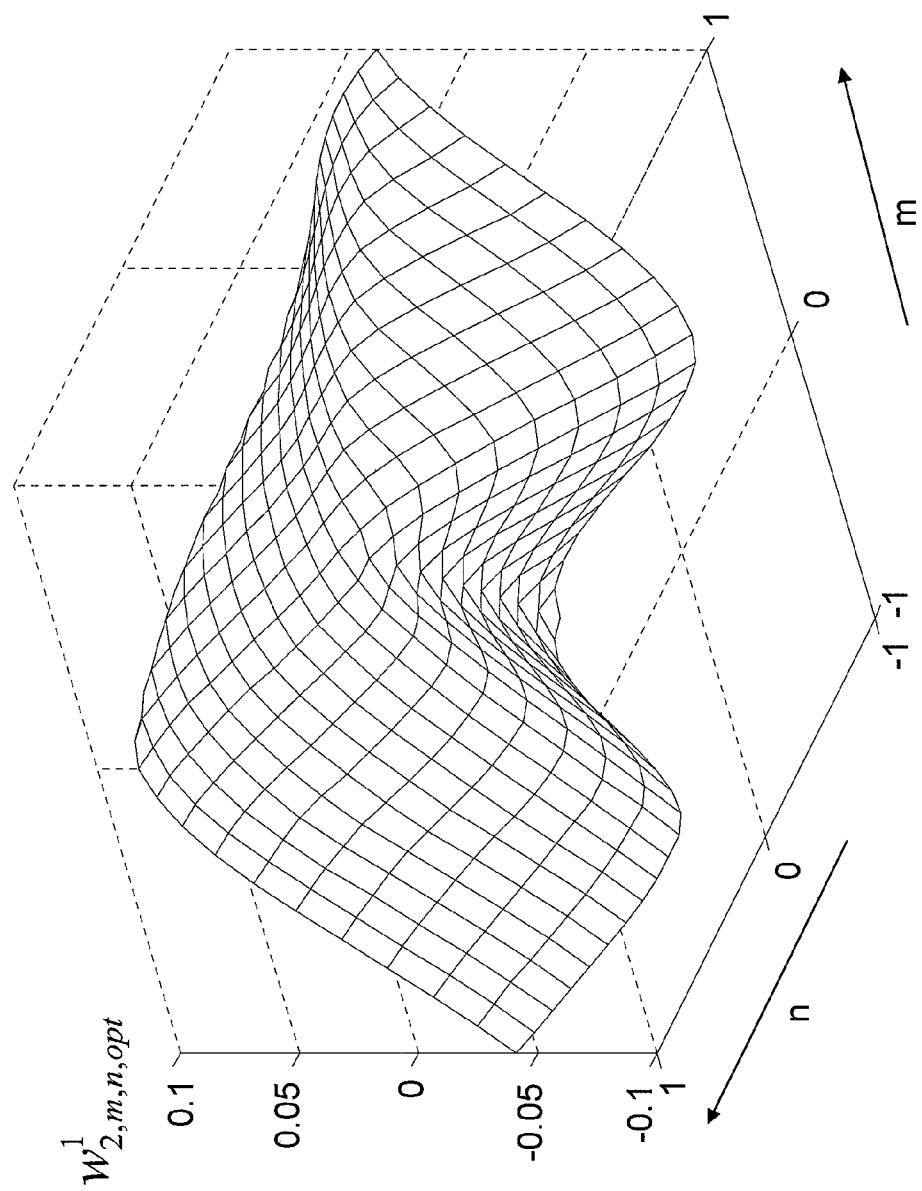
FIGS. 13-15 show the coefficients of the second level LMS filters of a 9/wavelet transform respectively.
Figure 14:
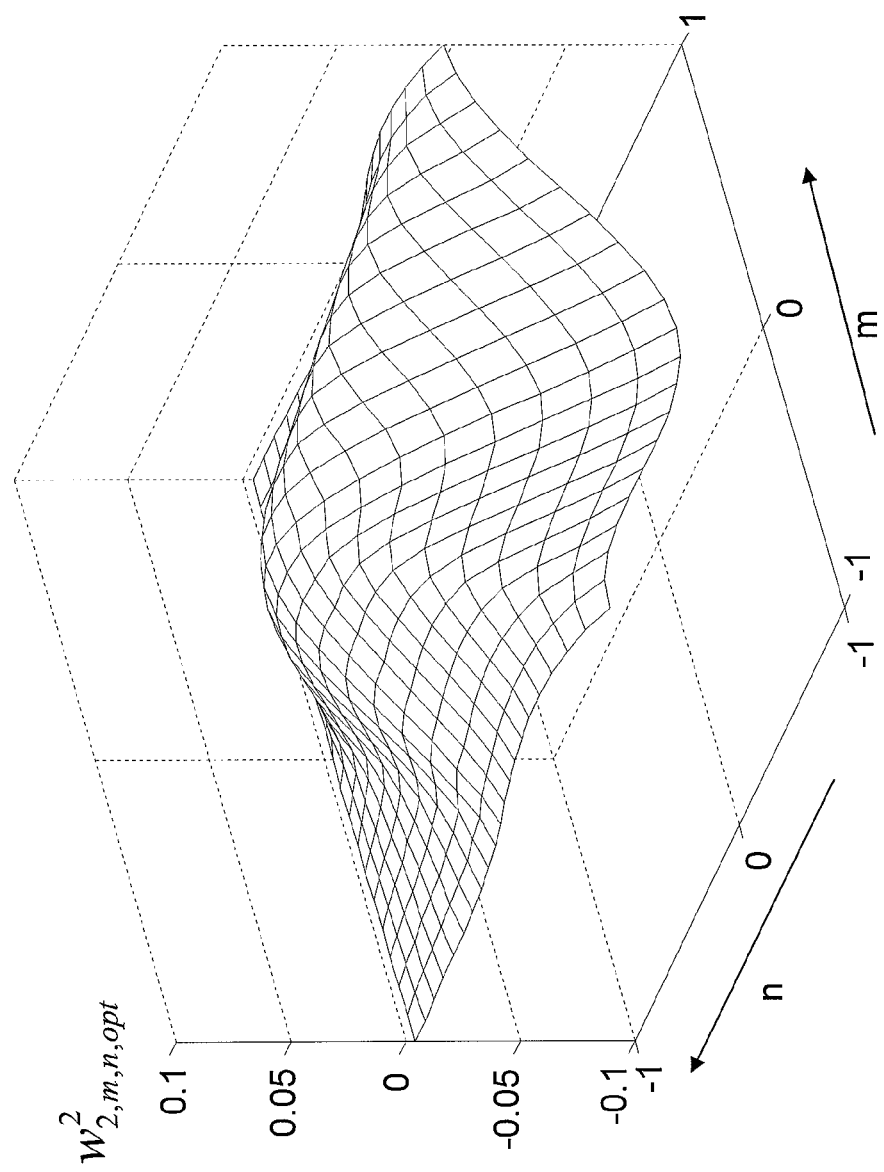
Figure 15:
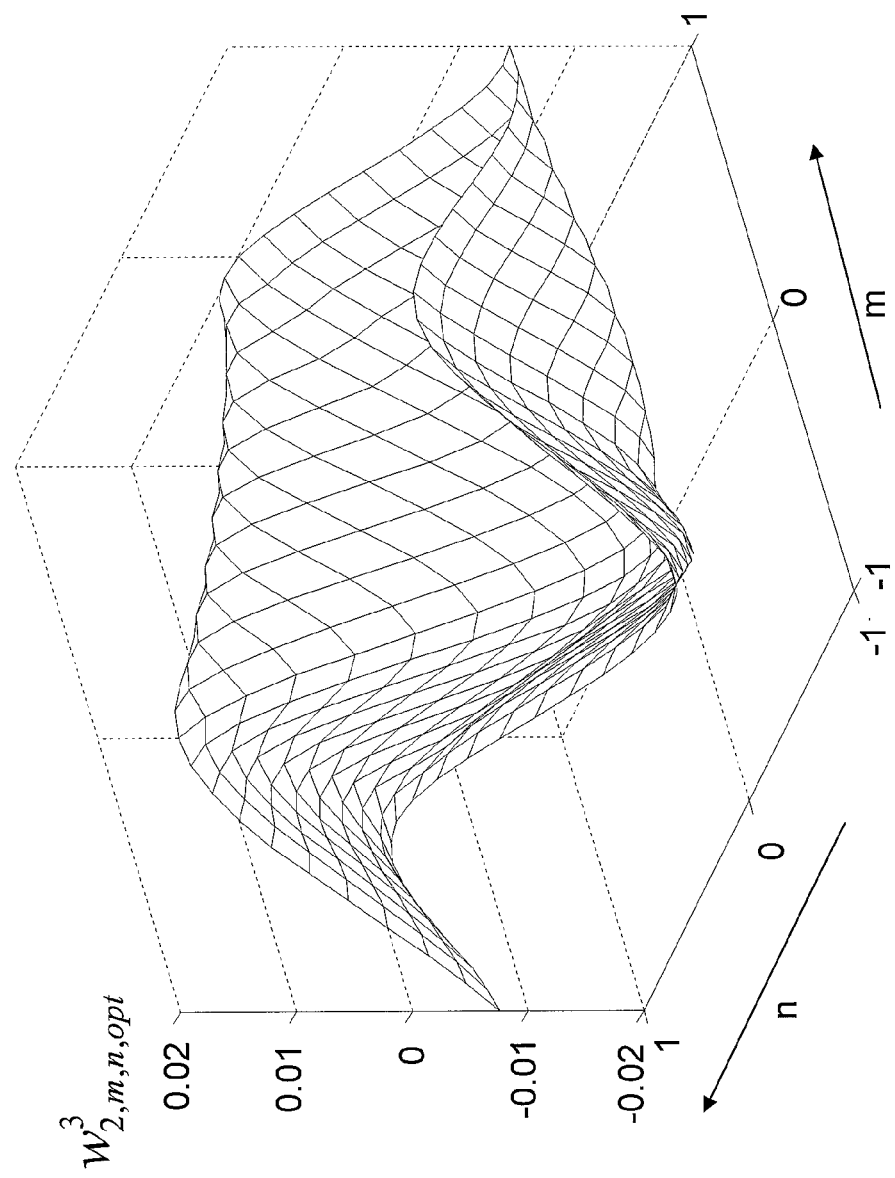

In an embodiment of the present invention, the support region R (i.e. size) of the filters 22, 24, 26, 48, 50 and 52 is 3×3, where $-1 \leq m \leq 1$ and $-1 \leq n \leq 1$. If the wavelet transform performed to decompose the original training image 10 is a 5/3 wavelet transform, the first level LMS filters 22, 24 and 26 of the 5/3 wavelet transform can be respectively represented in FIGS. 4-6, and the second level LMS filters 48, 50 and 52 of the 5/3 wavelet transform can be respectively represented in FIGS. 7-9. If the wavelet transform performed to decompose the original training image 10 is a 9/7 wavelet transform, the first level LMS filters 22, 24 and 26 of the 9/7 wavelet transform can be respectively represented in FIGS. 10-12, and the second level LMS filters 48, 50 and 52 of the 9/7 wavelet transform can be respectively represented in FIGS. 13-15.

When the optimized filters 22, 24 and 26 are obtained, 1 to 3 watermarks could be hidden in the subbands $LH_1$, $HL_1$ and $HH_1$. Please refer to FIG. 16, which is a schematic diagram showing the procedure for hiding watermarks 102, 104 and 106 in the subbands $LH_1$, $HL_1$ and $HH_1$ by using 1-level wavelet transform according to an embodiment of the present invention. Firstly, an original image 90 is decomposed into a first data set 92 in the subband $LL_1$, a second data set 94 in the subband $LH_1$, a third data set 96 in the subband $HL_1$, and a fourth data set 98 in the subband $HH_1$ by 1-level wavelet transform. Then, an embedding means 100 embeds the first watermark 102 in the second data set 94, the second watermark 104 in the third data set 96, and the third watermark 106 in the fourth data set 98. The embedding means 100 could be a software, firmware or hardware. The algorithm of the embedding means 100 for embedding the watermarks are not limited. Since various algorithms for hiding watermarks by performing wavelet transform have been known by the persons skilled in the art, it is unnecessary to describe the detail of the algorithm of embedding means 100. However, an improved algorithm for hiding watermarks by performing wavelet transform will be introduced later. The embedding means 100 outputs a first watermarked data set 108 in the subband $LH_1$ by embedding the watermark 102 into the second data set 94. Similarly, the embedding means 100 outputs a second watermarked data set 110 in the subband $HL_1$ by embedding the watermark 104 into the third data set 96, and outputs a third watermarked data set 112 in the subband $HH_1$ by embedding the watermark 106 into the fourth data set 98. Later, the first data set 92, the first watermarked data set 108, the second watermarked data set 110, and the third watermarked data set 112 are transformed into a watermarked image, 114 by an inverse wavelet transform. Generally, the dimension of each of the watermarks 102, 104 and 106 is a quarter of that of the original image 90. Moreover, since the three subbands $LH_1$, $HL_1$ and $HH_1$ of the four subbands $LL_1$, $LH_1$, $HL_1$ and $HH_1$ could be used to embed the watermarks, a ratio of the data amount of the three watermarks 102, 104 and 106 to the data amount of the original image 90 is 75%, i.e 3/4. Additionally, although all of three watermarks 102, 104 and 106 are respectively embedded into the subbands $LH_1$, $HL_1$ and $HH_1$, it should be noted that only one or two of the watermarks 102, 104 and 106 would be embedded into the subbands $LH_1$, $HL_1$ and $HH_1$ according to other embodiments of the present invention.

When the watermarked image 114 is obtained, the watermarks could be extracting from the watermarked image 114. Please refer to FIG. 17, which is a schematic diagram showing the procedure for extracting the watermarks from the watermarked image 114. Firstly, the watermarked image 114 is decomposed into a first data set 116 in the subband $LL_1$, a second data set 118 in the subband $LH_1$, a third data set 120 in the subband $HL_1$, and a fourth data set 122 in the subband $HH_1$ by 1-level wavelet transform. Basically, the first data set 116 would be identical with the first data set 92, the second data set 118 would be identical with the first watermarked data set 108, the third data set 120 would be identical with the second watermarked data set 110, and the fourth data set 122 would be identical with the third watermarked data set 112. After the 1-level wavelet transform of the watermarked image 114, the first data set 116 in the subband $LL_1$ is sequentially converted into a first predicted data set 124 in the subband $LH_1$ via the first LMS filter 22, into a second predicted data set 126 in the subband $HL_1$ via the second LMS filter 24, and into a third predicted data set 128 in the subband $HH_1$ via the third LMS filter 26. Then, a comparator 130 extracts a first hidden watermark 134 by comparing the first predicted data set 124 with the second data set 118, extracts a second hidden watermark 136 by comparing the second predicted data set 126 with the third data set 120, and extracts a third hidden watermark 138 by comparing the third predicted data set 128 with the fourth data set 122. Because the three predicted data sets 124, 126 and 128 are obtained by converting the first data set 116 via the three LMS filters 22, 24 and 26, the three predicted data sets 124, 126 and 128 would resemble the second, third and fourth data sets 94, 96 and 98 of the original image 90 respectively. Therefore, the results of the comparisons of the predicted data sets 124, 126 and 128 with the data sets 118, 120 and 122 would contain embedded information about the watermarks 102, 104 and 106 such that the comparator 130 could extract the first hidden watermark 134, the second hidden watermark 136 and the third hidden watermark 138, which respectively resemble the watermark 102, 104 and 106, from the watermarked image 114.

In another embodiment of the present invention, one or two of the watermarks 102, 104 and 106 is/are randomly embedded into the subbands $LH_1$, $HL_1$ and $HH_1$. Therefore, only one or two of the hidden watermarks 134, 136 138 would be extracted from the watermarked image 114.

In another embodiment of the present invention, more watermarks could be hidden in the subbands $LH_1$, $HL_1$, $HH_1$, $LH_2$, $HL_2$ and $HH_2$ by using a 2-level wavelet transform. Please refer to FIG. 18, which is a schematic diagram showing the procedure for hiding watermarks 102, 104, 106, 172, 174 and 176 in the subbands $LH_1$, $HL_1$, $HH_1$, $LH_2$, $HL_2$ and $HH_2$ by using 2-level wavelet transform according to one of the embodiments of the present invention. Firstly, an original image 90 is decomposed into a first data set 152 in subband $LL_2$, a second data set 154 in subband $LH_2$, a third data set 156 in subband $HL_2$, a fourth data set 158 in subband $HH_2$, a fifth data set 160 in the subband $LH_1$, the sixth data set 162 in the subband $HL_1$, and a seventh data set 164 in the subband $HH_1$ by 2-level wavelet transform. Similarly, the embedding means 100 outputs a first watermarked data set 184 in the subband $LH_2$ by embedding the watermark 172 into the second data set 154, outputs a second watermarked data set 186 in the subband $HL_2$ by embedding the watermark 174 into the third data set 156, outputs a third watermarked data set 188 in the subband $HH_2$ by embedding the watermark 176 into the fourth data set 158, outputs a fourth watermarked data set 190 in the subband $LH_1$ by embedding the watermark 102 into the fifth data set 160, outputs a fifth watermarked data set 192 in the subband $HL_1$ by embedding the watermark 104 into the sixth data set 160, and outputs a sixth watermarked data set 194 in the subband $HH_1$ by embedding the watermark 106 into the seventh data set 164. Later, the first data set 152 and the first, second, third, fourth, fifth and sixth watermarked data sets 184, 186, 188, 190, 192 and 194 are transformed into a watermarked image 200 by an inverse wavelet transform. Generally, the dimension of each of the watermarks 172, 174 and 176 is a quarter of that of watermarks 102, 104 and 106. Moreover, since only the subband $LL_2$ is not used to embed the watermarks, a ratio of the data amount of the embedded watermarks 102, 104, 106, 172, 174 and 176 to the data amount of the original image 90 is 93.25%, i.e $$\left(1 - \frac{1}{4^2}\right).$$

Additionally, although the six watermarks 102, 104, 106, 172, 174 and 176 are embedded into the subbands $LH_2$, $HL_2$, $HH_2$, $LH_1$, $HL_1$ and $HH_1$, it should be noted that fewer watermark(s) would be embedded into the subbands $LH_2$, $HL_2$, $HH_2$, $LH_1$, $HL_1$ and $HH_1$ according to other embodiments of the present invention.

When the watermarked image 200 is obtained, the hidden watermarks could be extracting from the watermarked image 200. Please refer to FIG. 19, which is a schematic diagram showing the procedure for extracting the watermarks from the watermarked image 200. Firstly, the watermarked image 200 is decomposed into a first data set 202 in the subband $LL_2$, a second data set 204 in the subband $LH_2$, a third data set 206 in the subband $HL_2$, a fourth data set 208 in the subband $HH_2$, a fifth data set 210 in the subband $LH_1$, a sixth data set 212 in the subband $HL_1$, and a seventh data set 214 in the subband $HH_1$ by 2-level wavelet transform. Basically, the first data set 202 would be identical with the first data set 152, and the data sets 204-214 would be respectively identical with the watermarked data sets 184-194. After the 2-level wavelet transform of the watermarked image 200, the first data set 202 in the subband $LL_2$ is sequentially converted into a first predicted data set 224 in the subbands $LH_2$ via the LMS filter 48, into a second predicted data set 226 in the subbands $HH_2$ via the LMS filter 50, and into a third predicted data set 228 in the subbands $HH_2$ via the LMS filter 52. Then, a comparator 240 extracts a first hidden watermark 250 by comparing the first predicted data set 224 with the second data set 204, extracts a second hidden watermark 252 by comparing the second predicted data set 226 with the third data set 206, and extracts a third hidden watermark 254 by comparing the third predicted data set 228 with the fourth data set 208. Because the predicted data sets 224, 226 and 228 are obtained by converting the first data set 202 in the subband $LL_2$ via the LMS filters 48, 50 and 52, the predicted data sets 224, 226 and 228 would respectively resemble the second, third and fourth data sets 154, 156 and 158 of the original image 90 in the subbands $LH_2$, $HL_2$ and $HH_2$. Therefore, the results of the comparisons of the predicted data sets 224, 226 and 228 with the data sets 204, 206 and 208 would contain embedded information about the watermarks 172, 174 and 176 such that the comparator 240 could extract the first hidden watermark 250, the second hidden watermark 252 and the third hidden watermark 254, which respectively resemble the watermark 172, 174 and 176, from the watermarked image 200.

Additionally, the first data set 202 in the subband $LL_2$ and the predicted data sets 224, 226 and 228 in the subbands $LH_2$, $HL_2$ and $HH_2$ are transformed into a fourth predicted data set 230 in the subband $LL_1$ by an inverse wavelet transform. The fourth predicted data set 230 is sequentially converted into a fifth predicted data set 234 in the subbands $LH_1$ via the LMS filter 22, into a sixth predicted data set 236 in the subbands $HL_1$ via the LMS filter 24, and into a seventh predicted data set 238 in the subbands $LH_1$ via the LMS filter 26. Then, the comparator 130 extracts a fourth hidden watermark 256 by comparing the fifth predicted data set 234 with the fifth data set 210, extracts a fifth hidden watermark 258 by comparing the sixth predicted data set 236 with the sixth data set 212, and extracts a sixth hidden watermark 260 by comparing the seventh predicted data set 238 with the seventh data set 214. Because the fourth predicted data set 230 is transformed from the first data set 202 and the predicted data sets 224, 226 and 228, and the three predicted data sets 234, 236 and 238 are obtained by converting the fourth predicted data set 230 via the three LMS filters 22, 24 and 26, the three predicted data sets 234, 236 and 238 would respectively resemble the fifth, sixth and seven data sets 160, 162 and 164 of the original image 90 in the subbands $LH_1$, $HL_1$ and $HH_1$ respectively. Therefore, the results of the comparisons of the predicted data sets 234, 236 and 238 with the data sets 210, 212 and 214 would contain embedded information about the watermarks 102, 104 and 106 such that the comparator 130 could extract the fourth hidden watermark 256, the fifth hidden watermark 258 and the sixth hidden watermark 260, which respectively resemble the watermark 102, 104 and 106, from the watermarked image 200.

In another embodiment of the present invention, 1 to 5 of the watermarks 102, 104, 106, 172, 174 and 176 is/are embedded into the subbands $LH_1$, $HL_1$, $HH_1$, $LH_2$, $HL_2$ and $HH_2$. Therefore, only 1 to 5 of the hidden watermarks 250, 252, 254, 256, 258 and 260 would be extracted from the watermarked image 200.

Herein, an improved algorithm for hiding watermarks by using a just noticeable difference (JND) is introduced. Watson et al. published their research "Visibility of wavelet quantization noise" on "IEEE Transactions on Image Processing", Vol. 6, No. 8, pp. 1164-1175, August 1997. According to this research, a model fitted to for calculating a minimum threshold Yin the spatial domain is represented as follows:

$$\log Y = \log a + k(\log f - \log g_\theta f_0)^2 \qquad (6)$$

where f represents a corresponding spatial frequency of a viewing distance. According to another research of Bradley, "A wavelet visible difference predictor", published on "IEEE Transactions on Image Processing", Vol. 8, No. 5, pp. 717-730, May 1999, a=0.495, k=0.466, $f_0$=0.401, and $g_\theta$=1.501, 1, 0.534 for the $LL_1$ LH/HL, and HH subbands. Moreover, according to the research of Watson et al., for a display resolution of r pixels/degree, the spatial frequency f of level X can be represented as follows:

$$f = r \cdot 2^{-\lambda} \quad (7)$$

Further, for a given viewing distance v in cm and a display resolution d in pixels/cm, the effective display visual resolution (DVR) r in pixels/degree of visual angle is $$r = dv \tan\left(\frac{\pi}{180}\right). \quad (8)$$

Additionally, the minimum threshold Y in the spatial domain should be converted into the just noticeable difference $t_{JND}$ ($\lambda$, $\theta$) of subband {$\lambda$, $\theta$} in the frequency domain according to the method of Bradley. The just noticeable difference is $$t_{JND}(\lambda, \theta) = \frac{Y}{i_\theta \cdot F_h^{2(\lambda-1)}}. \quad (9)$$

where $i_\theta$ is either represents $F_l^2$, $F_h^2$, or $F_l F_h$ for the subbands LL, HH, LH/HL, $F_l$ represents a maximum coefficient of a low pass filter, and $F_h$ represents a maximum coefficient of a high pass filter.

Figure 16:
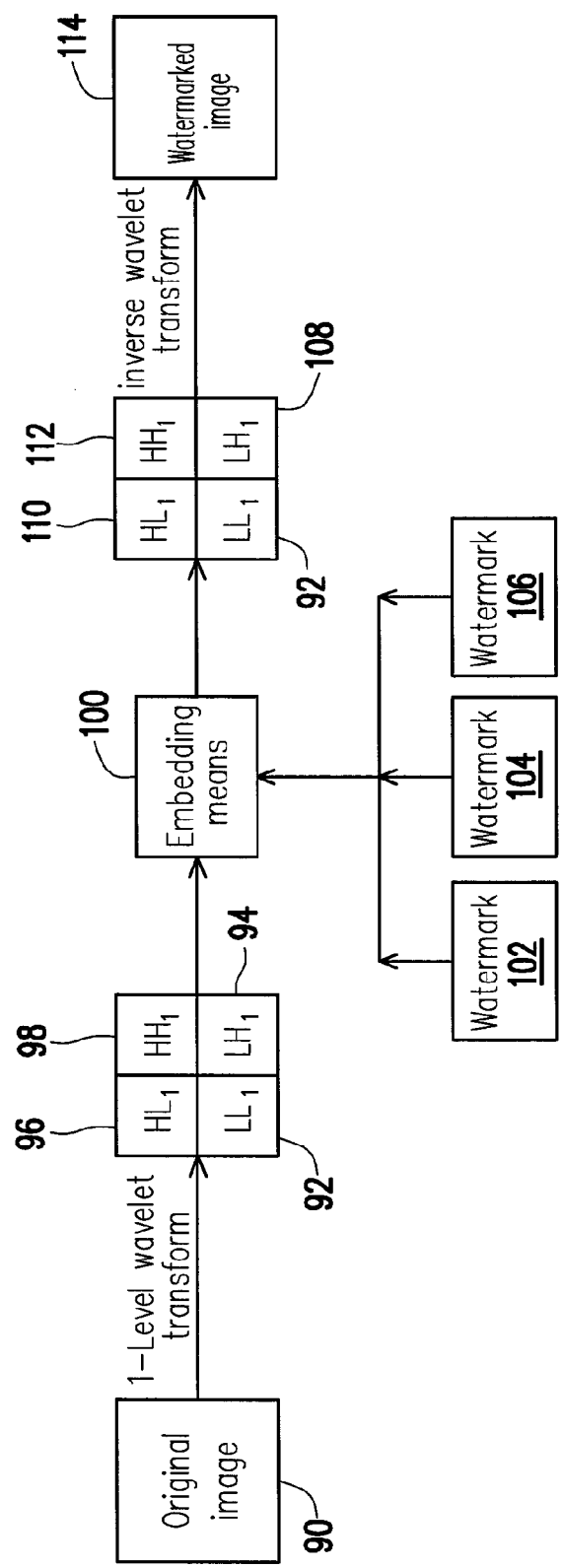
FIG. 16 is a schematic diagram showing the procedure for hiding watermarks in the subbands $LH_1$, $HL_1$ and $HH_1$ by using 1-level wavelet transform according to an embodiment of the present invention.
Figure 18:
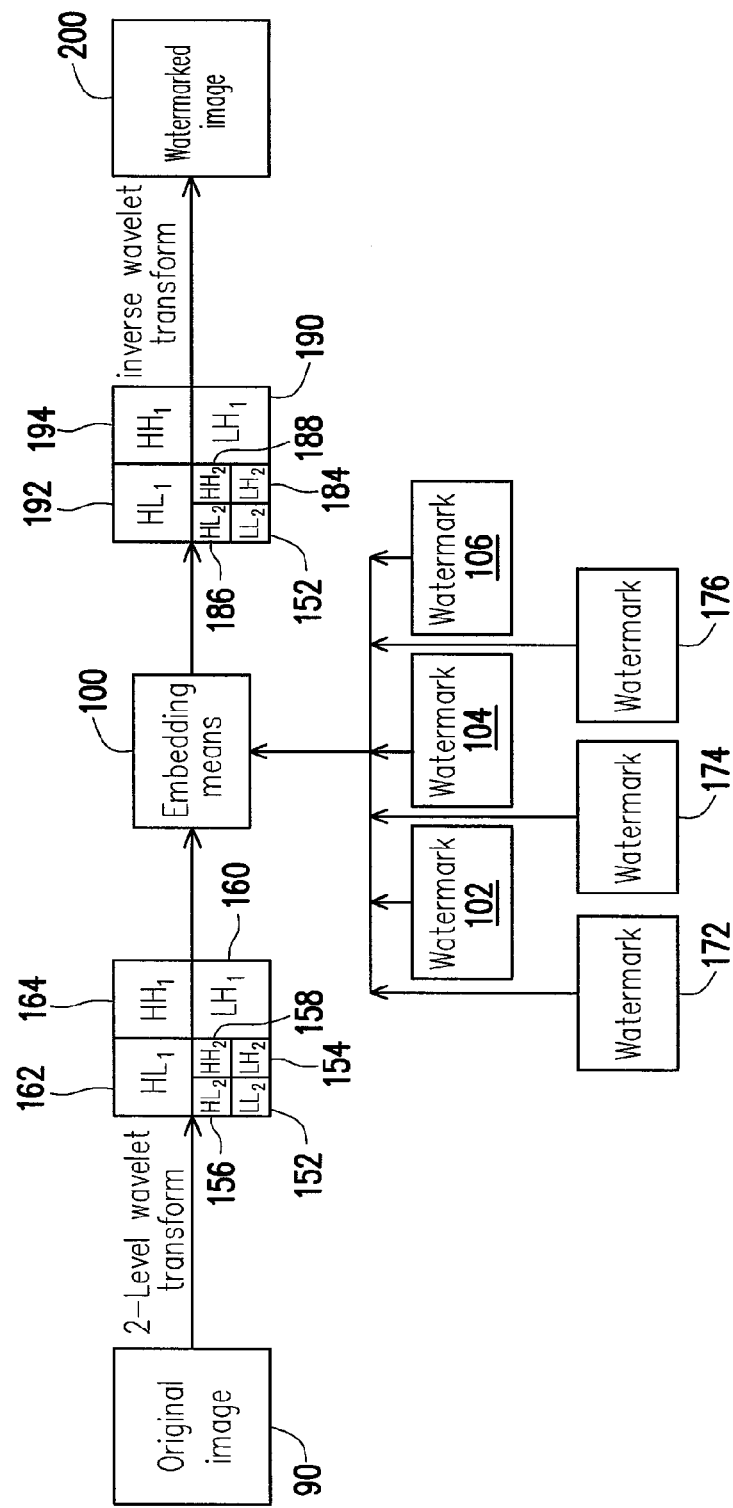
FIG. 18 is a schematic diagram showing the procedure for hiding watermarks in the subbands $LH_1$, $HL_1$, $HH_1$, $LH_2$, $HL_2$ and $HH_2$ by using 2-level wavelet transform according to one of the embodiments of the present invention.

Since the just noticeable difference $t_{JND}(\lambda, \theta)$ is obtained, the watermarks could be embedded into corresponding high subbands $LH_1$, $HL_1$, $HH_1$, $LH_2$, $HL_2$ or $HH_2$. For simplicity's sake, the watermarks are halftone images. The procedure for embedding the halftone watermarks into corresponding data set O in subband {$\lambda$, $\theta$} is formulated as follows:

$$\begin{cases} \text{if } W^\theta_{\lambda,i,j} = 1, & O^\theta_{\lambda,w,i,j} = O^\theta_{\lambda,i,j} + t_{JND}(\lambda, \theta) \\ \text{if } W^\theta_{\lambda,i,j} = 0, & O^\theta_{\lambda,w,i,j} = O^\theta_{\lambda,i,j} \end{cases} \quad (10)$$

$$\theta \in (2, 3, 4), \quad \lambda \in (1, 2)$$

where $W^\theta_{\lambda,i,j}$ represents the pixel value of the watermark for the subband {$\lambda$, $\theta$} at position (i, j), $O^\theta_{\lambda,i,j}$ represents an original coefficient of the data set O in subband {$\lambda$, $\theta$} at position (i, j), and $O\lambda,w,i,j^\theta$ represents the adjusted coefficient of the data set O in subband {$\lambda$, $\theta$} at position (i, j) after watermarking. As shown in FIGS. 16 and 18, when finishing embedding the watermarks 102, 104 and 106 (or 102, 104, 106, 172, 174 and 176), a watermarked image 114 or 200 can be obtained by transforming corresponding watermarked data sets by an inverse wavelet transform.

Figure 17:
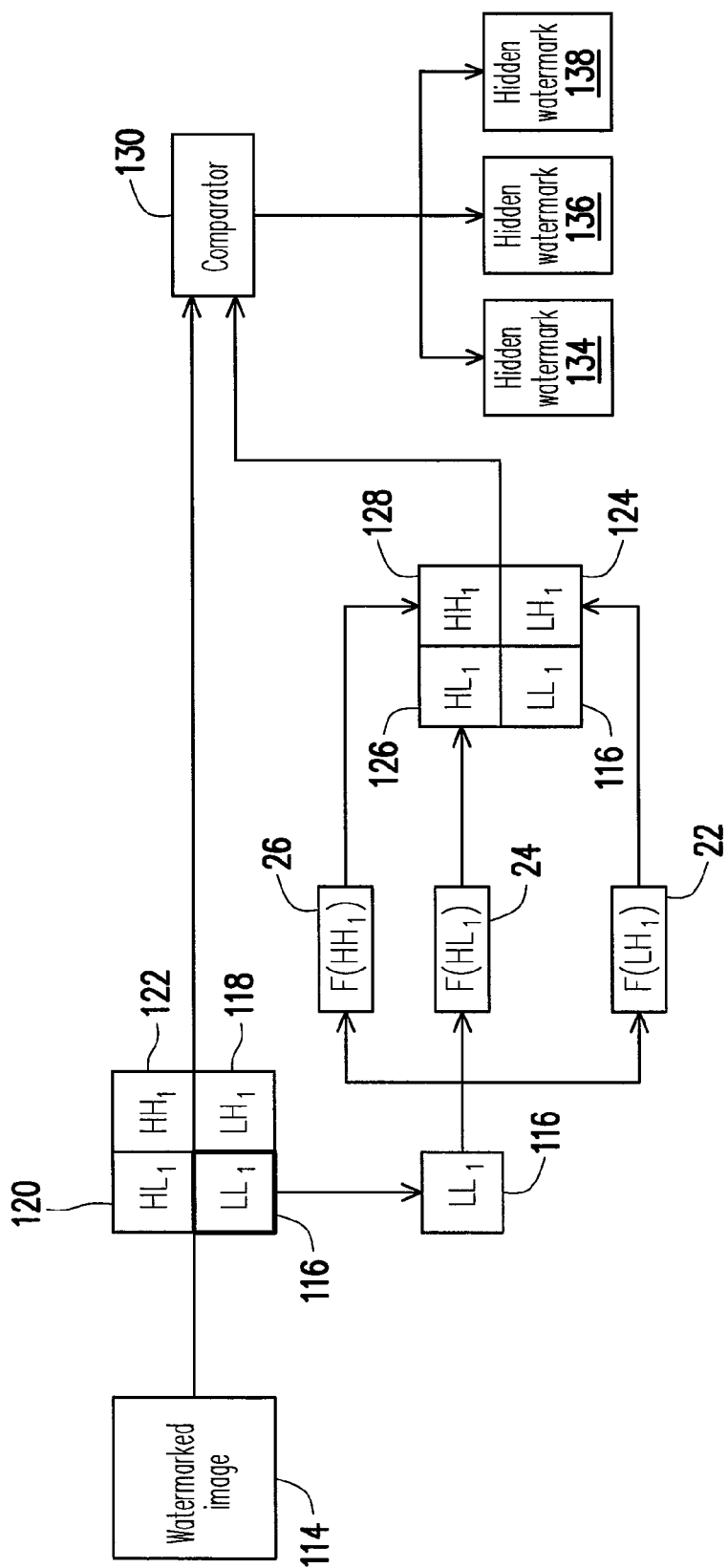
FIG. 17 is a schematic diagram showing the procedure for extracting the watermarks from the watermarked image shown in FIG. 16.
Figure 19:
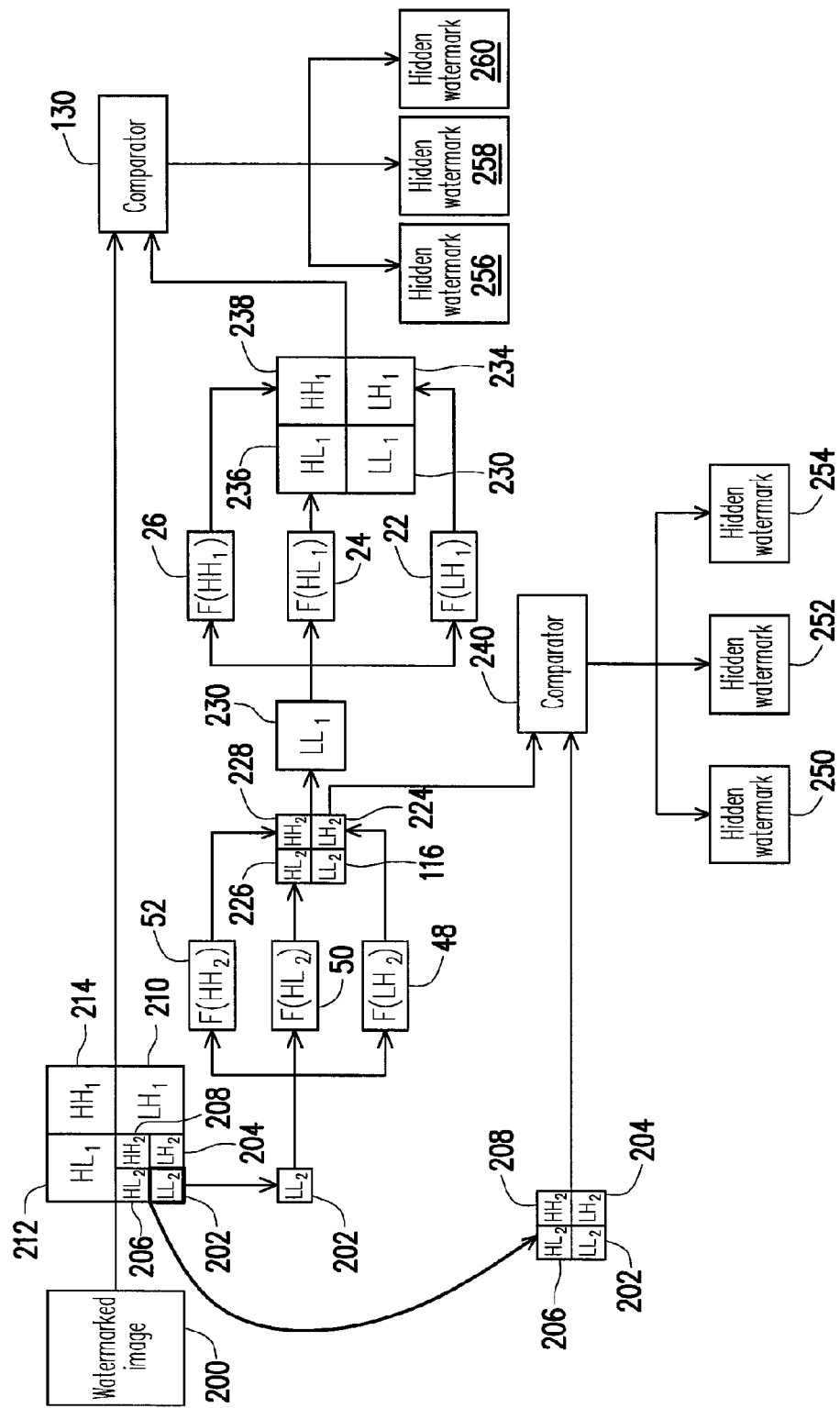
FIG. 19 is a schematic diagram showing the procedure for extracting the watermarks from the watermarked image shown in FIG. 18.

As shown in FIGS. 17 and 19, the hidden watermarks could be extracted from the watermarked image 114 or 200. Firstly, the watermarked image 114 or 200 is decomposed into corresponding data sets O' in the high subbands. The procedure for extracting the watermarks is formulated as follows:

$$O^\theta_{\lambda,p,i,j} = \sum_{m,n \in R} \sum w^\theta_{\lambda,m,n,opt} O'^1_{\lambda,i+m,j+n}, \quad (11)$$

$$\theta \in (2, 3, 4), \lambda \in (1, 2)$$

$$O^\theta_{\lambda,d,i,j} = O'^\theta_{\lambda,w,i,j} - O^\theta_{\lambda,p,i,j}, \quad \theta \in (2, 3, 4), \lambda \in (1, 2) \quad (12)$$

$$\begin{cases} W^\theta_{\lambda,r,i,j} = 1, & \text{if } O^\theta_{\lambda,d,i,j} > T^\theta_{\lambda,opt} \\ W^\theta_{\lambda,r,i,j} = 0, & \text{otherwise} \end{cases} \quad (13)$$

where $O_{\lambda,p,i,j}^\theta$ represents a predicted coefficient of corresponding predicted data set in the high subband {$\lambda$, $\theta$} at position (i, j);

$O'_{\lambda,i+m,j+n}^1$ represents a coefficient of the data set 116 or 202 in the low subband {$\lambda$, 1}, i.e. $LL_1$ or $LL_2$, at position (i+m, j+n);

the optimum coefficient $w_{\lambda,m,n,opt}^\theta$ is obtained according to the equations (1)-(5);

$O'_{\lambda,w,i,j}^\theta$ represents a coefficient, of the data set in the high subband {$\lambda$, $\theta$} at position (i, j), obtained by performing the inverse wavelet transform for the watermarked image 114 or 200;

$O_{\lambda,d,i,j}^\theta$ represents the difference between the coefficient $O'_{\lambda,w,i,j}^\theta$ and the predicted coefficient $O_{\lambda,p,i,j}^\theta$;

$W_{\lambda,r,i,j}^\theta$ represents the pixel value of the embedded watermark in the subband {$\lambda$, $\theta$} at position (i, j);

$T_{\lambda,opt}^\theta$ represents a threshold for distinguishing the display levels of the pixels of the embedded halftone watermark. Briefly, the pixel of the extracted watermark from the subband {$\lambda$, $\theta$} at position (i, j) is a white pixel if $O_{\lambda,d,i,j}^\theta > T_{\lambda,opt}^\theta$, and the pixel of the extracted watermark from the subband {$\lambda$, $\theta$} at position (i, j) is a black pixel if $O_{\lambda,d,i,j}^\theta \leq T_{\lambda,opt}^\theta$. Herein, the threshold $T_{\lambda,opt}^\theta$ is set to be a half of the just noticeable difference $t_{JND}(\lambda, \theta)$.

In order to estimate the benefits of the blind wavelet-based watermarking method of the present invention, two quantification values are defined herein. The first quantification value is correct decode rate (CDR), and the other quantification value is normalized correlation (NC). The two quantification values are defined as follows:

$$NC = \frac{\sum_{\theta=2}^{4} \sum_{i=0}^{BW-1} \sum_{j=0}^{BL-1} VW^\theta_{\lambda,i,j} W^\theta_{\lambda,rp,i,j}}{\sqrt{\sum_{\theta=2}^{4} \sum_{i=0}^{BW-1} \sum_{j=0}^{BL-1} (VW^\theta_{\lambda,i,j})^2} \cdot \sqrt{\sum_{\theta=2}^{4} \sum_{i=0}^{BW-1} \sum_{j=0}^{BL-1} (W^\theta_{\lambda,rp,i,j})^2}}, \quad (14)$$

$$\lambda \in (1, 2)$$

$$CDR = \frac{\text{The number of identical pixles}}{BW \times BL} \times 100\% \quad (15)$$

$$= \frac{N_i}{BW \times BL} \times 100\%$$

where $VW_{\lambda,i,j}^\theta$ represents a pixel value of an original watermark for the subband {$\lambda$, $\theta$}, e.g. the watermark 102 for the subband $LH_1$, at position (i, j);

$W_{\lambda,rp,i,j}^\theta$ represents a pixel value of an extracted watermark from the subband {$\lambda$, $\theta$}, e.g. the extracted watermark 134 from the subband $LH_1$, at position (i, j);

BW represents the width of the original watermark or the extracted watermark;

BL represents the length of the original watermark or the extracted watermark; and $N_i$ represents the number of identical pixels of the original watermark or the extracted watermark.

The pseudo-code for calculating the number $N_i$ of the subband $\{\lambda, \theta\}$ can be expressed as follows:

```
N_i = 0                              /* initiating N_i */
for each i
    for each j
        if VW_{λ,i,j}^θ = W_{λ,rp,i,j}^θ, then N_i = N_i + 1
    endfor (j)
endfor (i)
```

Figure 20A:
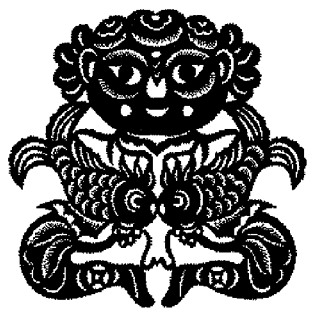
FIG. 20(a) shows an experimental image of the watermark 102 embedded into the subband $LH_1$.
Figure 20B:
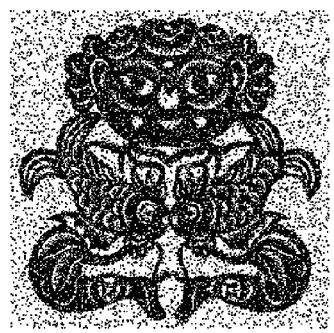
FIG. 20(b) shows the hidden watermark 256 extracted from the subband $LH_1$.
Figure 20C:
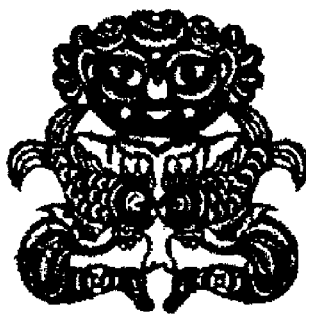
FIG. 20(c) shows an image obtained by filtering the hidden watermark shown in FIG. 20(b) via a 3×3 median filter.
Figure 20D:
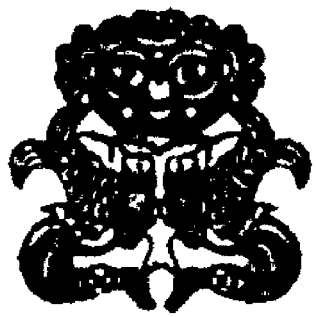
FIG. 20(d) shows an image obtained by filtering the hidden watermark shown in FIG. 20(b) via a 5×5 median filter.
Figure 21A:
FIG. 21(a) shows an experimental image of the watermark 104 embedded into the subband $HL_1$.
Figure 21B:
FIG. 21(b) shows the hidden watermark 258 extracted from the subband $HL_1$.
Figure 21C:
FIG. 21(c) shows an image obtained by filtering the hidden watermark shown in FIG. 21(b) via the 3×3 median filter.
Figure 21D:
FIG. 21(d) shows an image obtained by filtering the hidden watermark shown in FIG. 21(b) via the 5×5 median filter.

In order to increase the CDR, a median filter could be used to filter the extracted watermarks. Several experimental median filters with different sizes are test. For example, one of the median filters has a size of 3×3, and another median filter has a size of 5×5. Please refer to FIGS. 20(a)-20(d) and FIGS. 18-19. FIG. 20(a) shows an experimental image of the watermark 102 embedded into the subband $LH_1$. FIG. 20(b) shows the hidden watermark 256 extracted from the subband $LH_1$. The CDR and the NC of the hidden watermark 256 with respect to the watermark 102 shown in FIG. 20(a) are respectively 88.2% and 0.76. FIG. 20(c) shows an image obtained by filtering the hidden watermark 256 shown in FIG. 20(b) via the 3×3 median filter. The CDR and the NC of the image in FIG. 20(c) with respect to the watermark 102 shown in FIG. 20(a) are respectively 93.72% and 0.87. FIG. 20(d) shows an image obtained by filtering the hidden watermark 256 shown in FIG. 20(b) via the 5×5 median filter. The CDR and the NC of the image in FIG. 20(d) with respect to the watermark 102 shown in FIG. 20(a) are respectively 91.89% and 0.84. It is obvious that the CDR and the NC are increased after using the 3×3 median filter or the 5×5 median filter. The conclusion is also adapted for the subbands $HL_1$, $HH_1$, $LH_2$, $HL_2$ and $HH_2$ Please refer to FIGS. 21(a)-(d). FIG. 21(a) shows an experimental image of the watermark 104 for the subband $HL_1$. FIG. 21(b) shows a corresponding image of the hidden watermark 258, which has the CDR of 89.14% and the NC of 0.78, extracted from the subband $HL_1$. FIG. 21(c) shows a corresponding filtered image, which has the CDR of 96.6% and the NC of 0.93, produced by the 3×3 median filter. FIG. 21(d) shows a corresponding filtered image, which has the CDR of 95.78% and the NC of 0.92, produced by the 5×5 median filter.

Figure 22A:
FIG. 22(a) shows an experimental image of the watermark 106 embedded into the subband $HH_1$.
Figure 22B:
FIG. 22(b) shows the hidden watermark 260 extracted from the subband $HH_1$.
Figure 22C:
FIG. 22(c) shows an image obtained by filtering the hidden watermark shown in FIG. 22(b) via the 3×3 median filter.
Figure 22D:
FIG. 22(d) shows an image obtained by filtering the hidden watermark shown in FIG. 22(b) via the 5×5 median filter.

Please refer to FIGS. 22(a)-(d). FIG. 22(a) shows an experimental image of the watermark 106 for the subband $HH_1$. FIG. 22(b) shows a corresponding image of the hidden watermark 260, which has the CDR of 88.22% and the NC of 0.76, extracted from the subband $HH_1$. FIG. 22(c) shows a corresponding filtered image, which has the CDR of 92.91% and the NC of 0.86, produced by the 3×3 median filter. FIG. 22(d) shows a corresponding filtered image, which has the CDR of 90.26% and the NC of 0.81, produced by the 5×5 median filter.

Figure 23A:
FIG. 23(a) shows an experimental image of the watermark 172 embedded into the subband $LH_2$.
Figure 23B:
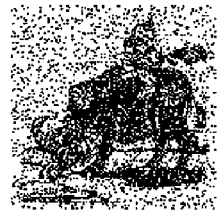
FIG. 23(b) shows the hidden watermark 250 extracted from the subband $LH_2$.
Figure 23C:
FIG. 23(c) shows an image obtained by filtering the hidden watermark shown in FIG. 23(b) via the 3×3 median filter.
Figure 23D:
FIG. 23(d) shows an image obtained by filtering the hidden watermark shown in FIG. 23(b) via the 5×5 median filter.

Please refer to FIGS. 23(a)-(d). FIG. 23(a) shows an experimental image of the watermark 172 for the subband $LH_2$. FIG. 23(b) shows a corresponding image of the hidden watermark 250, which has the CDR of 88.04% and the NC of 0.76, extracted from the subband $LH_2$. FIG. 23(c) shows a corresponding filtered image, which has the CDR of 91.52% and the NC of 0.83, produced by the 3×3 median filter. FIG. 23(d) shows a corresponding filtered image, which has the CDR of 89.93% and the NC of 0.8, produced by the 5×5 median filter.

Figure 24A:
FIG. 24(a) shows an experimental image of the watermark 174 embedded into the subband $HL_2$.
Figure 24B:
FIG. 24(b) shows the hidden watermark 252 extracted from the subband $HL_2$.
Figure 24C:
FIG. 24(c) shows an image obtained by filtering the hidden watermark shown in FIG. 24(b) via the 3×3 median filter.
Figure 24D:
FIG. 24(d) shows an image obtained by filtering the hidden watermark shown in FIG. 24(b) via the 5×5 median filter.

Please refer to FIGS. 24(a)-(d). FIG. 24(a) shows an experimental image of the watermark 174 for the subband $HL_2$. FIG. 24(b) shows a corresponding image of the hidden watermark 252, which has the CDR of 90.05% and the NC of 0.8, extracted from the subband $HL_2$. FIG. 24(c) shows a corresponding filtered image, which has the CDR of 92.47% and the NC of 0.85, produced by the 3×3 median filter. FIG. 24(d) shows a corresponding filtered image, which has the CDR of 91.5% and the NC of 0.83, produced by the 5×5 median filter.

Figure 25A:
FIG. 25(a) shows an experimental image of the watermark 176 embedded into the subband $HH_2$.
Figure 25B:
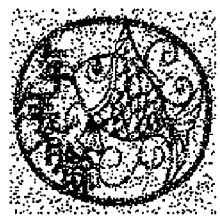
FIG. 25(b) shows the hidden watermark 254 extracted from the subband $HH_2$.
Figure 25C:
FIG. 25(c) shows an image obtained by filtering the hidden watermark shown in FIG. 25(b) via the 3×3 median filter.
Figure 25D:
FIG. 25(d) shows an image obtained by filtering the hidden watermark shown in FIG. 25(b) via the 5×5 median filter.

Please refer to FIGS. 25(a)-(d). FIG. 25(a) shows an experimental image of the watermark 176 for the subband $HH_2$. FIG. 25(b) shows a corresponding image of the hidden watermark 254, which has the CDR of 88.71% and the NC of 0.77, extracted from the subband $HH_2$. FIG. 25(c) shows a corresponding filtered image, which has the CDR of 91.75% and the NC of 0.84, produced by the 3×3 median filter. FIG. 25(d) shows a corresponding filtered image, which has the CDR of 87.66% and the NC of 0.75, produced by the 5×5 median filter.

Please refer to FIG. 26, which is a summarized table shows the above CDRs and NCs of the corresponding subbands $LH_1$, $HL_1$, $HH_1$, $LH_2$, $HL_2$ and $HH_2$.

Figure 27:
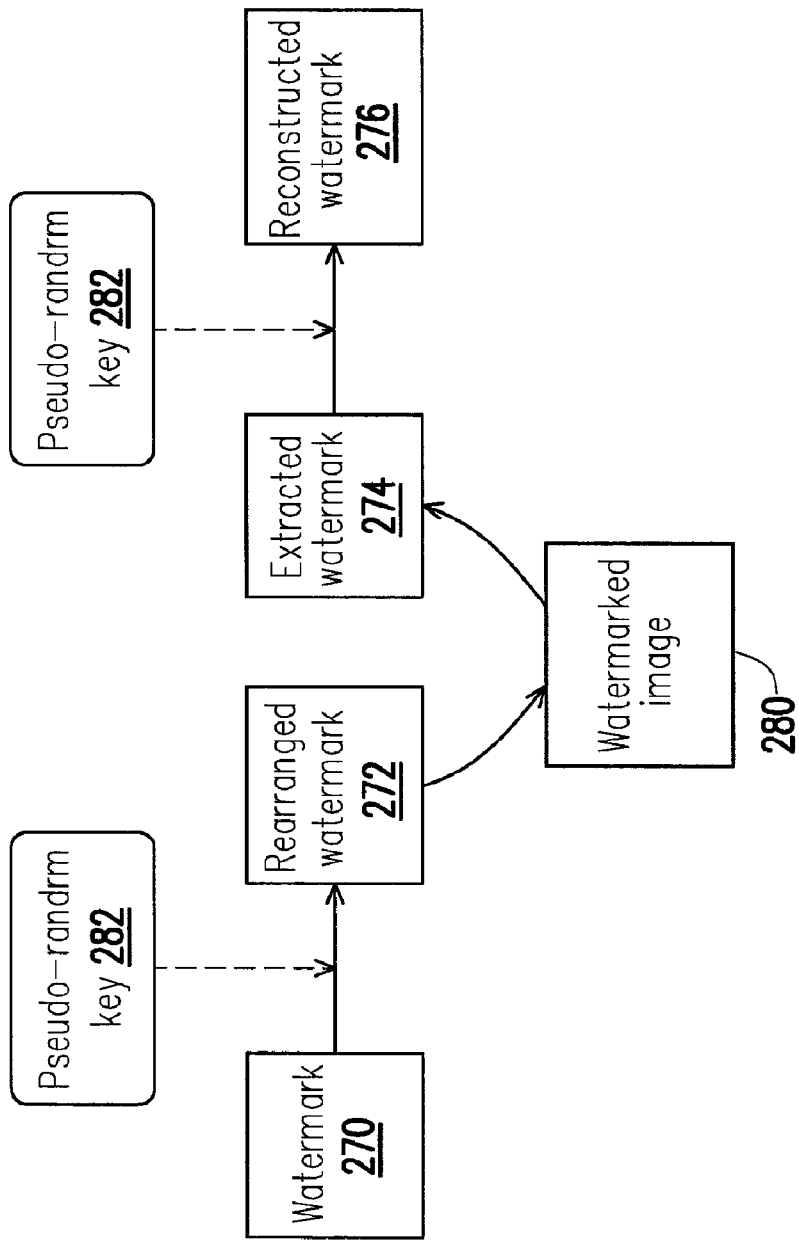
FIG. 27 is a schematic diagram showing how to use a pseudo-random key to rearrange the pixels of the watermarks.

Additionally, in order to enhance the strength of the embedded watermarks, a pseudo-random key could be used to rearrange the pixels of the watermarks. Please refer to FIG. 27, which is a schematic diagram showing how to use a pseudo-random key 282. Before a watermark 270 is hidden in a corresponding high subband of a watermarked image 280, the arrangement of the pixels of the watermark 270 is altered according to the pseudo-random key 282 such that the watermark 270 is converted into another watermark 272. Because the pixel values of the watermark 270 are not changed during this conversion, the watermark 272 also contains the information of the original pixel values of the watermark 270. However, since the arrangement of the pixels of the watermark 270 is altered, it is difficult to recognize the original appearance of the watermark 270 from the rearranged watermark 272. Then, the watermark 272 could be embedded into one of the high subbands. After embedding the watermark 272, the information of the embedded watermark 272 could be extracted from the corresponding high subband so as to output an extracted watermark 274. Later, the pseudo-random key 282 could be used again to recover the arrangement of the rearranged pixels such that a reconstructed watermark 276, which resembles the watermark 270, could be obtained by rearranging the pixels of the extracted watermark 274.

In order to estimate the preservation ability, of the watermarked images generated according to the present invention, for protecting the information of the embedded watermarks from attacks, such as cropping attacks and compression attacks, several experimental charts are obtained based on practical operations.

Figure 28:
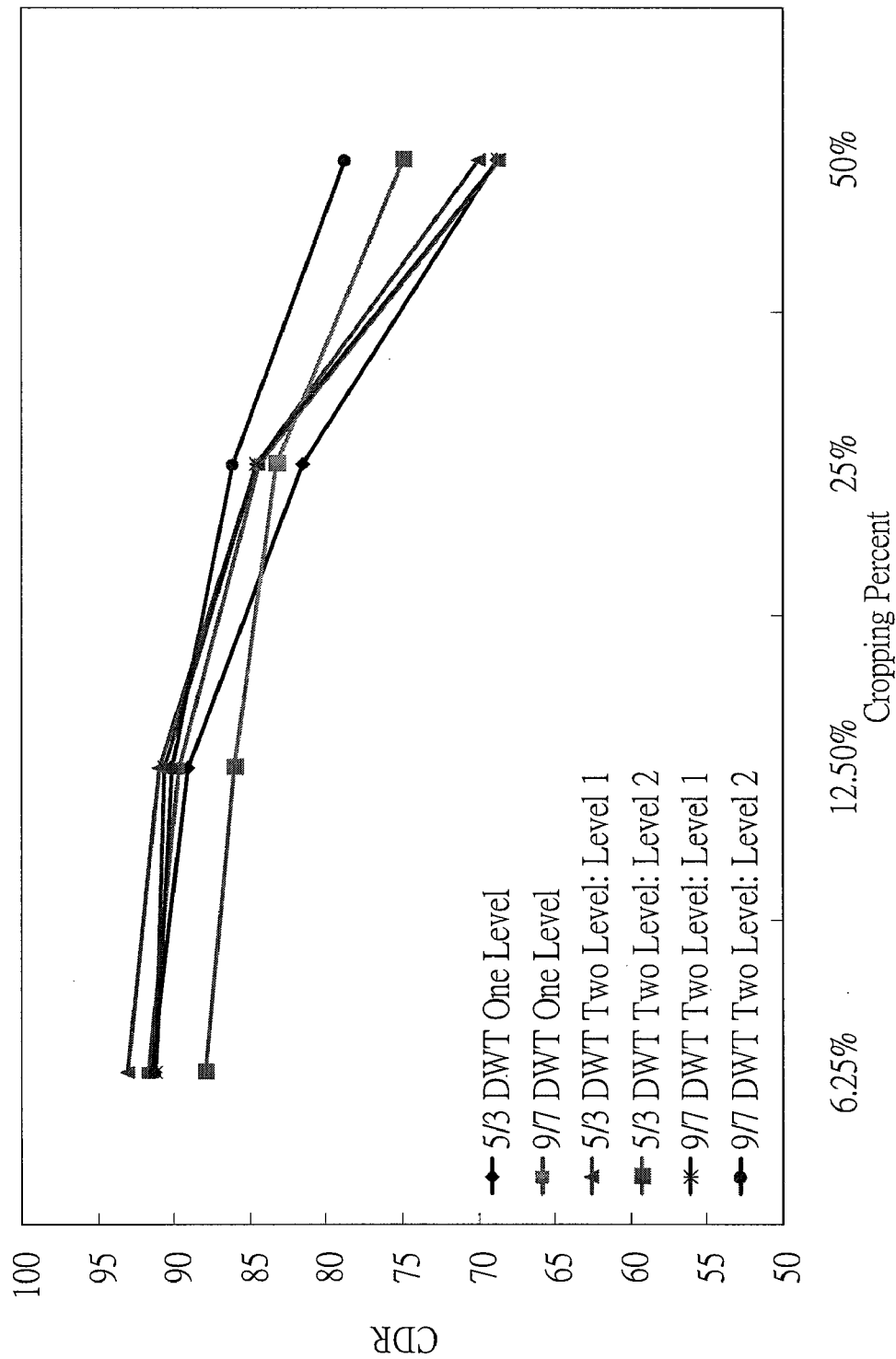
FIG. 28 is an experimental chart showing the relationship between a cropping percent and the corresponding CDR of an embedded watermark suffered a cropping attack.
Figure 29:
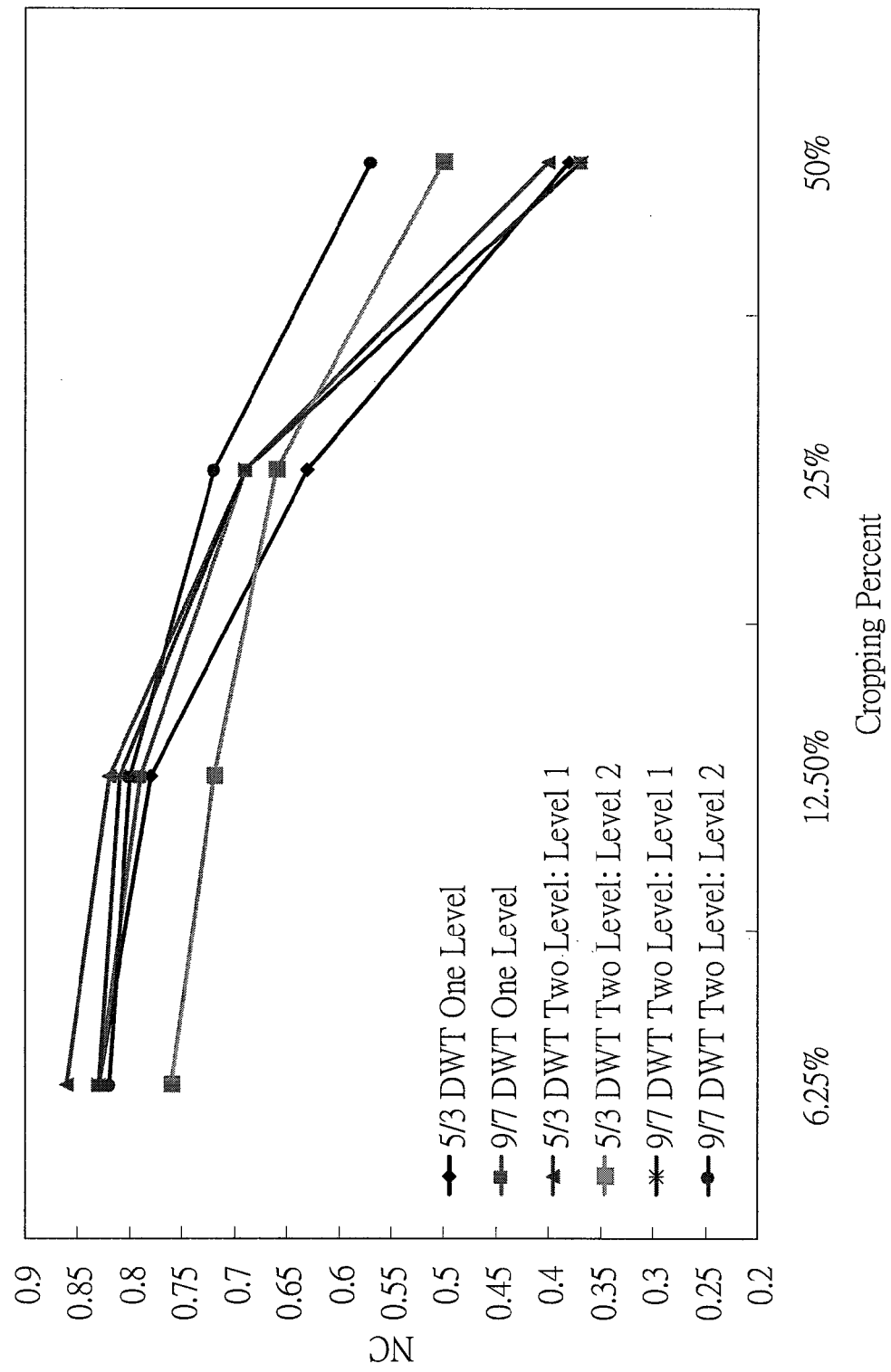
FIG. 29 is another experimental chart showing the relationship between a cropping percent and the corresponding NC of an embedded watermark suffered a cropping attack.
Figure 30:
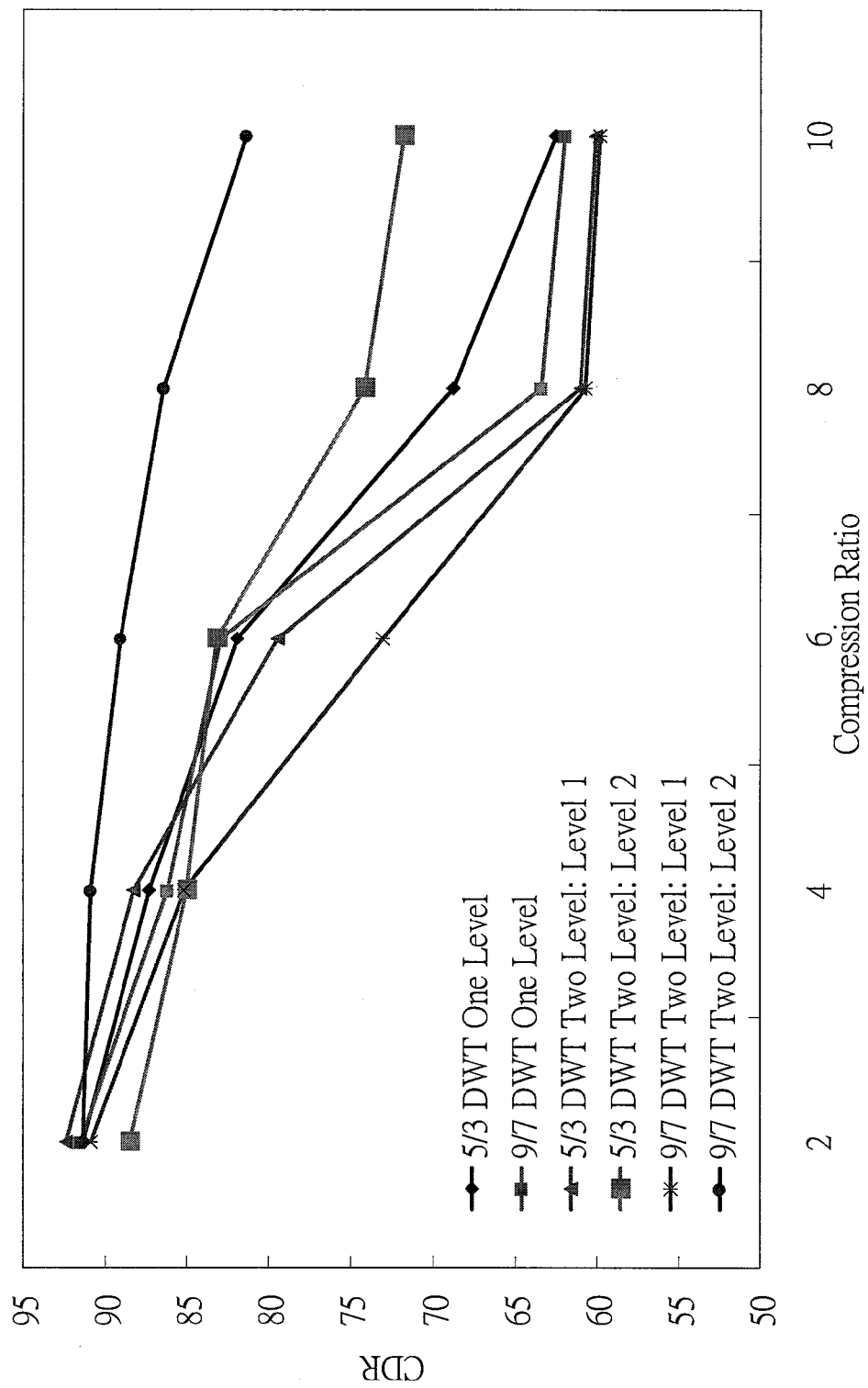
FIGS. 30 and 31 show the relationships between a compression ratio and the corresponding CDR or NC of an embedded watermark suffered a JPEG 2000 compression attack.
Figure 31:
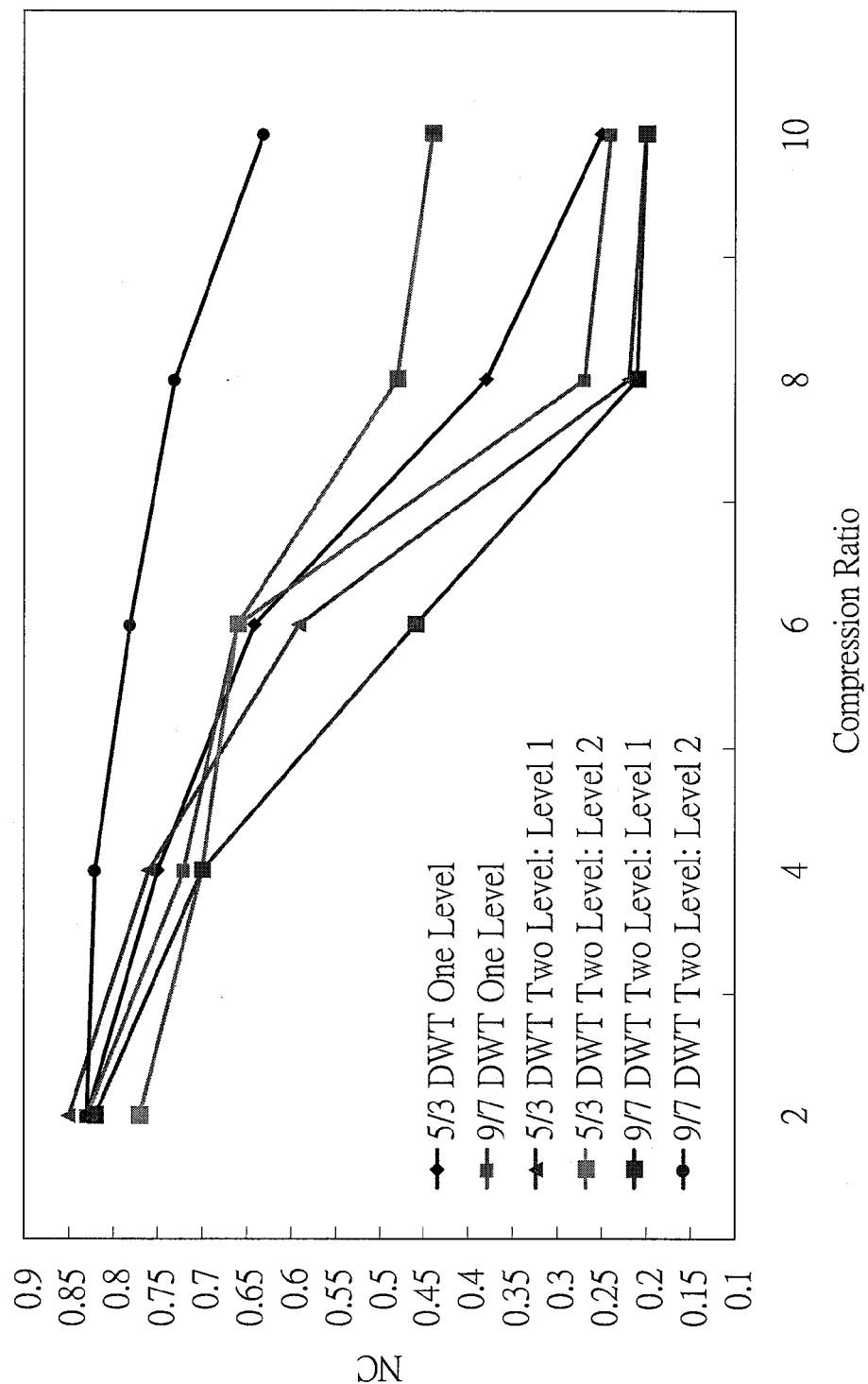
Figure 32:
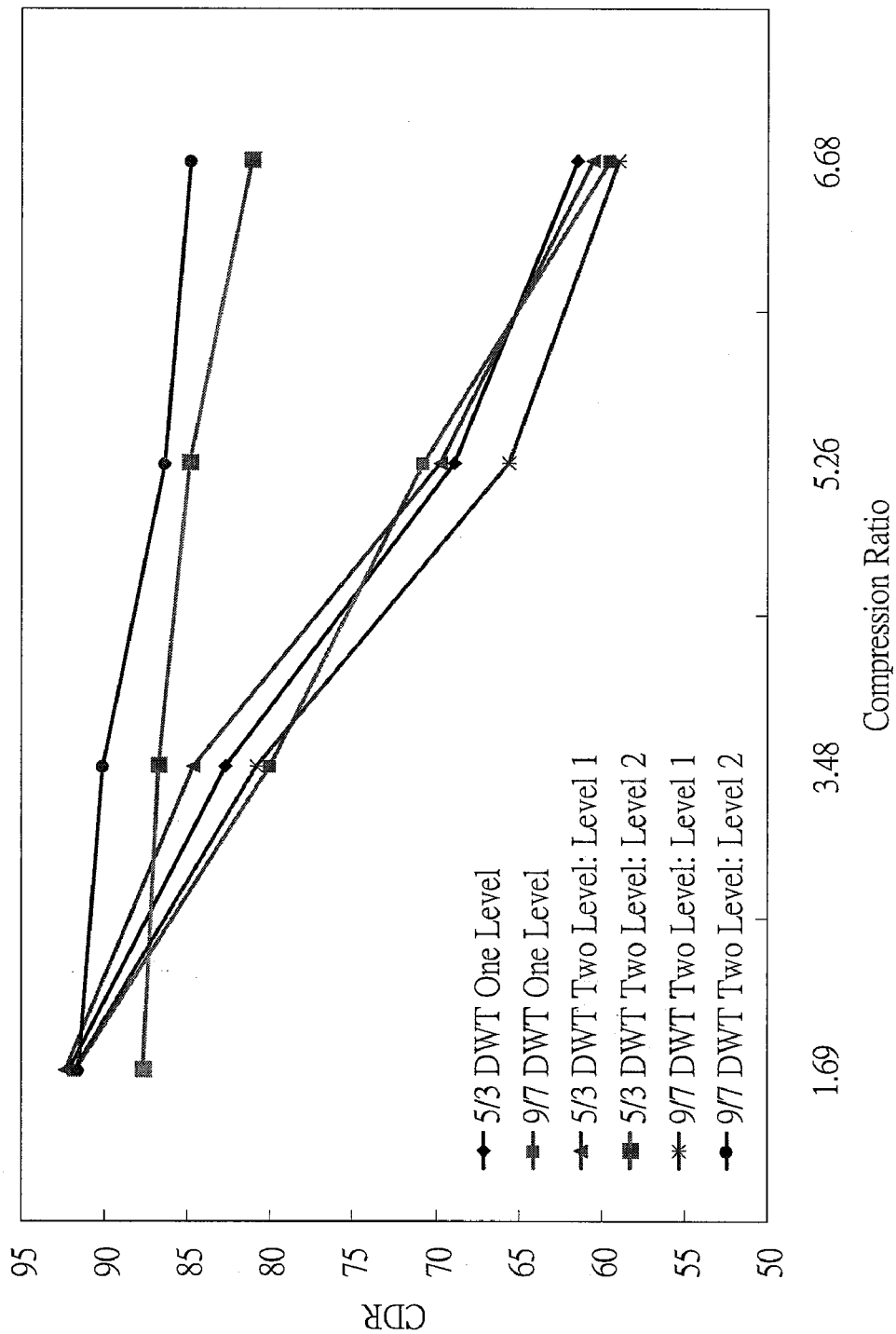
FIGS. 32 and 33 show the relationships between a compression ratio and the corresponding CDR or NC of an embedded watermark suffered a normal JPEG compression attack.
Figure 33:
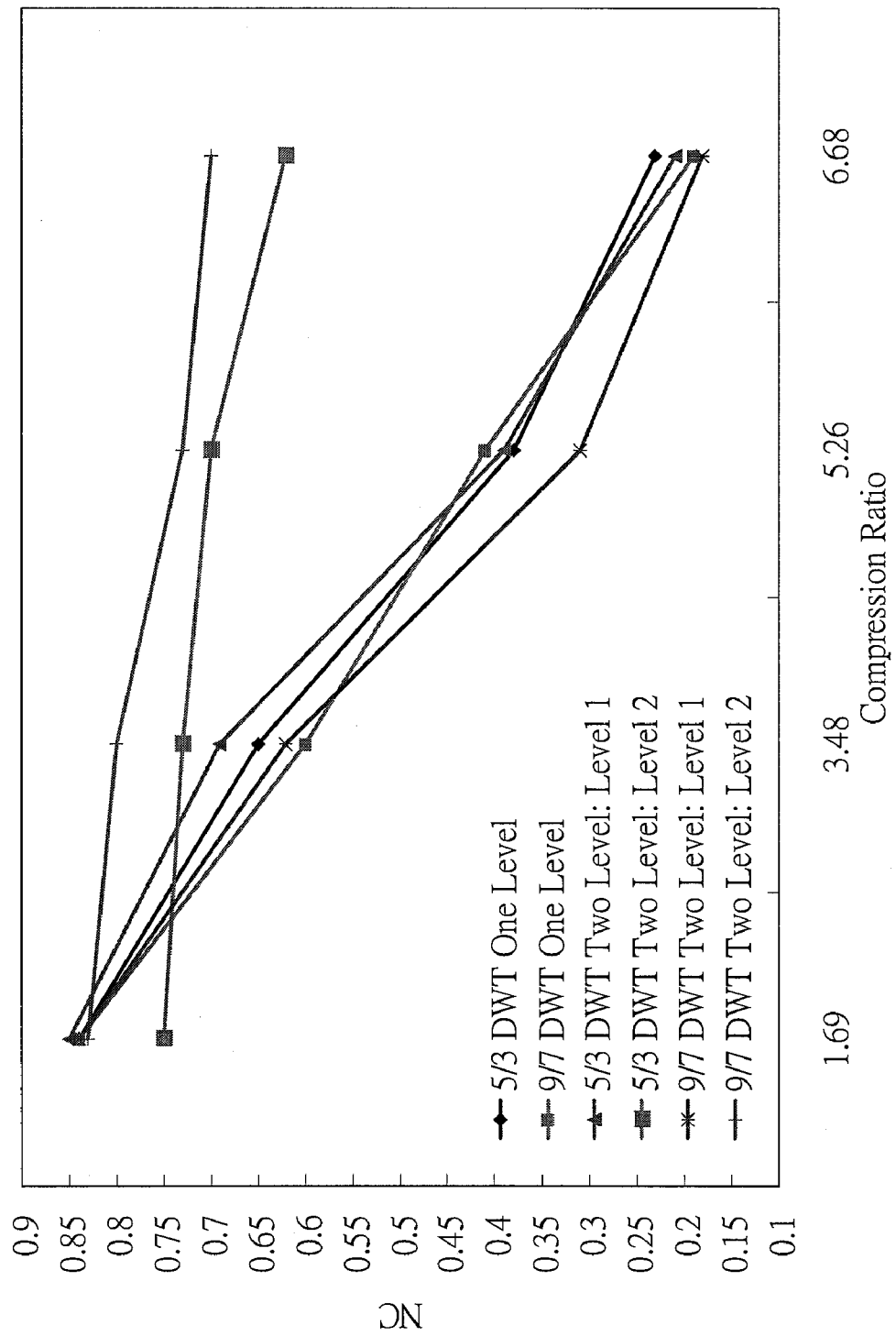

Please refer to FIGS. 28 and 29. FIG. 28 is an experimental chart showing the relationship between a cropping percent and the corresponding CDR of an embedded watermark suffered a cropping attack, and FIG. 29 is another experimental chart showing the relationship between a cropping percent and the corresponding NC of an embedded watermark suffered a cropping attack. Each of the curves shown in FIGS. 28 and 29 represents the CDR or the NC with respect to a specific wavelet transform algorithm. For example, the curve with marks "*" represents the relationship between cropping percent and the CDR while decoding a 1-level embedded watermark 256, 258 or 260 of a 2-level 9/7 wavelet transform, and the curve with marks "●" represents the relationship between cropping percent and the CDR while decoding a 2-level embedded watermark 250, 252 or 254 of a 2-level 9/7 wavelet transform. Similarly, FIGS. 30 and 31 show the relationships between a compression ratio and the corresponding CDR or NC of an embedded watermark suffered a JPEG 2000 compression attack, and FIGS. 32 and 33 show the relationships between a compression ratio and the corresponding CDR or NC of an embedded watermark suffered a normal JPEG compression attack. It is obvious that preservation ability of the present invention for protecting the information of the embedded watermarks from cropping attacks and compression attacks is excellent.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed:

1. A blind wavelet-based watermarking method for extracting at least one hidden watermark from a watermarked image, the method comprising:
    performing a wavelet transform to decomposed the watermarked image into a first data set in a subband $LL_1$, a second data set in a subband $LH_1$, a third data set in a subband $HL_1$ and a fourth data set in a subband $HH_1$;
    converting the first data set in the subband $LL_1$ into a first predicted data set in the subband $LH_1$, into a second predicted data set in the subband $HL_1$, and into a third predicted data set in the subband $HH_1$ via three LMS (least-mean-square) filters; and
    extracting the at least one hidden watermark by comparing the first predicted data set with the second data set, comparing the second predicted data set with the third data set, or comparing the third predicted data set with the fourth data set.

2. The blind wavelet-based watermarking method as claimed in claim 1, wherein extracting the at least one hidden watermark is extracting a first hidden watermark by comparing the first predicted data set with the second data set, extracting a second hidden watermark by comparing the second predicted data set with the third data set, and extracting a third hidden watermark by comparing the third predicted data set with the fourth data set.

3. The blind wavelet-based watermarking method as claimed in claim 1, wherein the wavelet transform is a 5/3 wavelet transform.

4. The blind wavelet-based watermarking method as claimed in claim 1, wherein the wavelet transform is a 9/7 wavelet transform.

* * * * *